US012243219B2

(12) United States Patent
Thomas et al.

(10) Patent No.: US 12,243,219 B2
(45) Date of Patent: Mar. 4, 2025

(54) CONTROLLING DEVICES IN OPERATIONS AREAS BASED ON ENVIRONMENTAL STATES DETECTED USING MACHINE LEARNING

(71) Applicant: Oshkosh AeroTech, LLC, Oshkosh, WI (US)

(72) Inventors: Grant Thomas, Spring, TX (US); Stephen C. Tatton, Spring, TX (US)

(73) Assignee: Oshkosh AeroTech, LLC, Oshkosh, WI (US)

( * ) Notice: Subject to any disclaimer, the term of this patent is extended or adjusted under 35 U.S.C. 154(b) by 500 days.

(21) Appl. No.: 17/458,076

(22) Filed: Aug. 26, 2021

(65) Prior Publication Data

US 2023/0066765 A1 Mar. 2, 2023

(51) Int. Cl.
| | |
|---|---|
| G06T 7/00 | (2017.01) |
| B64F 5/60 | (2017.01) |
| G06N 20/00 | (2019.01) |
| G06T 7/70 | (2017.01) |
| G08B 3/10 | (2006.01) |

(52) U.S. Cl.
CPC ............. *G06T 7/0008* (2013.01); *B64F 5/60* (2017.01); *G06N 20/00* (2019.01); *G06T 7/70* (2017.01);
(Continued)

(58) Field of Classification Search
CPC .................. G06T 7/0008; G06T 7/70; G06T 2207/10016; G06T 2207/20081;
(Continued)

(56) References Cited

U.S. PATENT DOCUMENTS 10,839,260 B1 * 11/2020 Khanna ................. G06F 18/214
11,182,610 B2    11/2021 Thompson et al.
(Continued)

FOREIGN PATENT DOCUMENTS

CA       2476879 C  * 12/2008 .............. B64F 1/002

OTHER PUBLICATIONS

International Search Report and Written Opinion mailed Jan. 26, 2023, issued in corresponding International Application No. PCT/US2022/075455, filed Aug. 25, 2022, 16 pages.
(Continued)

*Primary Examiner* — Ping Y Hsieh
*Assistant Examiner* — Vaisali Rao Koppolu
(74) *Attorney, Agent, or Firm* — Foley & Lardner LLP

(57) ABSTRACT

In some embodiments, a system is provided that includes an edge computing device and at least one camera configured to obtain image data depicting at least a portion of an operations area. The edge computing device includes a non-transitory computer-readable medium that has a model data store and computer-executable instructions stored thereon. The instructions cause the edge computing device to perform actions including receiving at least one image from the at least one camera; processing the at least one image using at least one machine learning model stored in the model data store to determine at least one environmental state within the operations area; and controlling a device based on the determined at least one environmental state. The machine learning model is trained by a model management computing system that obtains training data via low-bandwidth connections to edge computing devices.

18 Claims, 17 Drawing Sheets

(52) U.S. Cl.
CPC ...... *G08B 3/10* (2013.01); *G06T 2207/10016* (2013.01); *G06T 2207/20081* (2013.01); *G06T 2207/30252* (2013.01)

(58) Field of Classification Search
CPC . G06T 2207/30252; B64F 5/60; G06N 20/00; G08B 3/10; G06V 20/50; G06V 20/52; G06V 20/00
See application file for complete search history.

(56) References Cited

U.S. PATENT DOCUMENTS

| | | | |
|---|---|---|---|
| 2005/0198750 A1* | 9/2005 | Spencer | B64F 1/3055 14/71.5 |
| 2006/0288503 A1* | 12/2006 | Hutton | B64F 1/305 14/71.5 |
| 2018/0074473 A1* | 3/2018 | Truscott | G05B 19/042 |
| 2018/0354650 A1* | 12/2018 | Tan | G01S 17/933 |
| 2018/0371712 A1* | 12/2018 | Glatfelter | B64F 1/3055 |
| 2019/0278976 A1* | 9/2019 | Khadloya | G08B 13/19656 |
| 2020/0106992 A1* | 4/2020 | Thompson | G06T 7/70 |
| 2021/0208992 A1* | 7/2021 | Vega | G06F 11/302 |
| 2021/0339886 A1* | 11/2021 | Ye | G05B 19/0426 |
| 2022/0144453 A1* | 5/2022 | Wada | B64F 1/002 |

OTHER PUBLICATIONS

International Partial Search Report mailed Dec. 5, 2022, issued in corresponding International Application No. PCT/US2022/075455, filed Aug. 25, 2022, 12 pages.

* cited by examiner

CONTROLLING DEVICES IN OPERATIONS AREAS BASED ON ENVIRONMENTAL STATES DETECTED USING MACHINE LEARNING

BACKGROUND

Activities in operations areas (including, but not limited to, boarding gate areas for aircraft) are highly complex and highly choreographed. The presence and configuration of multiple apparatuses must be coordinated in order to successfully, efficiently, and safely execute the boarding and flight preparation process. It is desirable to automatically monitor operations in operations areas to improve efficiency and safety of operations. However, some operations areas (including aircraft boarding gate areas) are situated in remote locations with poor connectivity to centralized systems that are commonly used to support automated monitoring. What is needed are techniques that allow for automatic monitoring of operations areas by computing devices located at the operations areas without requiring high-bandwidth connectivity to centralized systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system is provided that includes at least one camera and an edge computing device. The at least one camera is configured to obtain image data depicting at least a portion of an operations area. The edge computing device has at least one processor and a non-transitory computer-readable medium. The edge computing device is communicatively coupled to the at least one camera. The non-transitory computer-readable medium has a model data store and computer-executable instructions stored thereon. The instructions, in response to execution by the at least one processor, cause the edge computing device to perform actions including receiving, by the edge computing device from a model management computing system, at least one machine learning model; storing, by the edge computing device, the at least one machine learning model in the model data store; receiving, by the edge computing device, at least one image from the at least one camera; processing, by the edge computing device, the at least one image using the at least one machine learning model to determine at least one environmental state within the operations area; and controlling, by the edge computing device, a device based on the determined at least one environmental state.

In some embodiments, a method of collecting training data and training one or more machine learning models for use on edge computing devices is provided. A model management computing system receives, from one or more edge computing devices via low-bandwidth connections, combined data streams including one or more images. The model management computing system processes the combined data streams to obtain the one or more images. For each image of the one or more images, the model management computing system receives one or more annotations of one or more objects within the image. The model management computing system adds the one or more annotations and the image to a training data set. The model management computing system trains one or more machine learning models using the training data set to generate new annotations of new images. The model management computing system transmits the trained one or more machine learning models to one or more edge computing devices.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In some embodiments of the present disclosure, systems and methods are provided that use one or more edge computing devices located at or near operations areas (e.g., aircraft boarding gates) that are communicatively coupled to one or more cameras positioned to view the operations areas. The edge computing devices use machine learning models to detect apparatuses (e.g., aircraft, passenger boarding bridges and components thereof, ground service vehicles, etc.) visible in the operations areas and the statuses thereof, and to thereby determine environmental states within the operations areas. The edge computing devices may communicate via a low-bandwidth connection to a model management computing system to provide images to be used to generate training data, and may receive trained machine learning models from the model management computing system.

Figure 1:
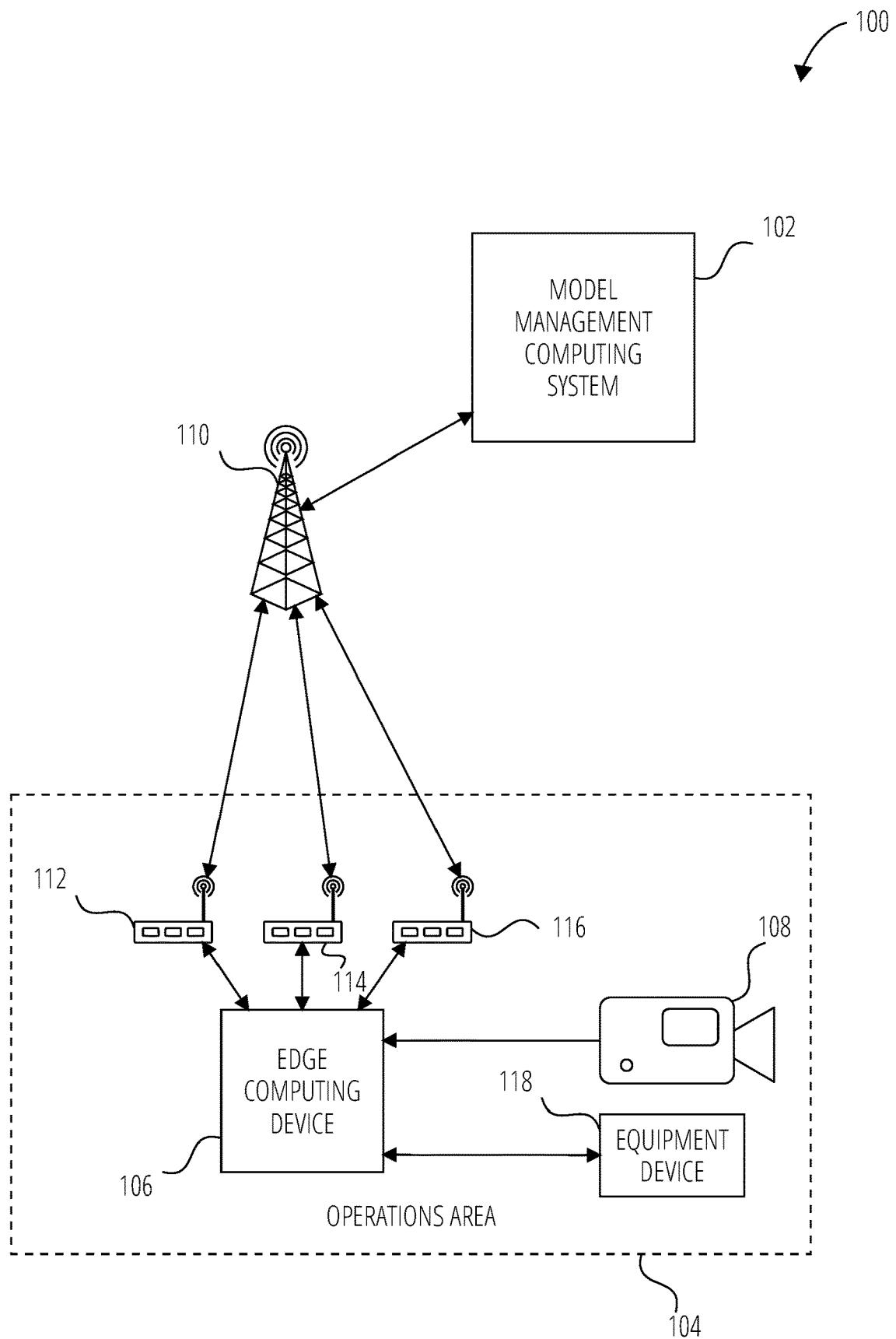
FIG. 1 is a schematic illustration of a non-limiting example embodiment of a system for monitoring one or more operations areas according to various aspects of the present disclosure.

FIG. 1 is a schematic illustration of a non-limiting example embodiment of a system for monitoring one or more operations areas according to various aspects of the present disclosure.

As shown, the system 100 is deployed with respect to an operations area 104. In some embodiments, the operations area 104 may be an aircraft boarding gate area, where an aircraft is parked in order to be serviced and to board/deboard passengers, crew, and/or cargo. In some embodiments, the operations area 104 may be an area where an aircraft is parked for other types of service, such as a de-icing area. However, these embodiments should not be seen as limiting. In other embodiments, the operations area 104 may be an area for another type of operations, including but not limited to other areas of air and/or space ports, space stations, marine ports, rail terminals and switching yards, transit stations, distribution facilities, manufacturing facilities, warehouses, parking garages, hospitals, schools, hotels, prisons, construction sites, amusement parks, stadiums, event venues, casinos, ski facilities, and other industrial and non-industrial environments.

Within the operations area 104 (or near the operations area 104), one or more cameras 108 are placed to view at least a portion of the operations area 104. In some embodiments, the one or more cameras 108 may include one or more internet protocol (IP) based camera having a range of capabilities. In some embodiments, the camera 108 may include a visible light sensor, an infrared sensor and LED for low-light or no-light image capture, a microphone, and/or other sensors. In some embodiments, the camera 108 may include a depth sensor for determining distances between the camera 108 and objects depicted in the image. In some embodiments, the camera 108 may include local storage for storing images and/or video before transmission to an edge computing device 106. Non-limiting examples of devices suitable for use as a camera 108 include models manufactured by ACTi Corporation of Taipei, Taiwan, including camera models Nos. B89 and I42.

In some embodiments, the cameras 108 are configured to communicate images and/or video to an edge computing device 106 via IP over a wireless communication technology (including but not limited to Wi-Fi, WiMAX, 2G, 3G, 4G, or LTE), a wired communication technology (including but not limited to Ethernet); via a communication protocol other than IP (including but not limited to USB, Bluetooth, HDMI, DVI, VGA); or via any other suitable technique. Typically, the cameras 108 communicate with the edge computing device 106 over a high-throughput connection such as a local-area network (LAN).

In some embodiments, the cameras 108 may transmit images (including but not limited to a stream of MJPEG frames or RAW frames), streaming video (including but not limited to a MPEG-4 stream, an HEVC/H.265 stream, or an H.264 stream), or any other image and/or video data to the edge computing device 106. Typically, the cameras 108 transmit and/or record video using a variable-bandwidth codec, including but not limited to H.264 or H.265. A variable-bandwidth codec is a codec in which strict limits on bandwidth used for encoded video are not respected by the encoding. Benefits of using variable-bandwidth codecs include the commercial availability of specialized hardware to accelerate encoding, decoding, and other processing, while drawbacks include having less control over the bandwidth of the recorded/transmitted video. For example, it has been found that attempts to encode video using H.264 or H.265 at 64 Kbps fail, because the encodings will periodically generate spikes that require greater than 64 Kbps.

In some embodiments, the edge computing device 106 also receives data streams from one or more equipment devices 118. The data streams received from the one or more equipment devices 118 may include telemetry, user input, or other information related to or collected by the one or more equipment devices 118. Telemetry may include information regarding states of the equipment devices 118, data sensed by the equipment devices 118, control input provided to the equipment devices 118, or any other type of information. The equipment devices 118 may communicate with the edge computing device 106 using any wired or wireless technology, including but not limited to BACnet, Modbus, ADS, Ethernet, IP, and physical I/O. The receipt of this information from equipment devices 118 may allow the edge computing device 106 to incorporate overlays into video streams representing the telemetry (or other) information, automatically tag images and/or video based on the telemetry (or other) information, and/or may allow the model management computing system 102 to generate such overlays or automatic tags.

In some embodiments, the edge computing device 106 may be a laptop computing device, a desktop computing device, a tablet computing device, a smartphone computing device, or any other suitable type of computing device that may be present at or near the operations area 104. Typically, an edge computing device 106 may be installed or present at a location in the operations area 104 at which an operator may interact with the edge computing device 106 (or at least with one or more devices controlled by the edge computing device 106). For example, if the operations area 104 is an aircraft boarding gate area, the edge computing device 106 may be installed near or integrated within a control panel of a passenger boarding bridge of the aircraft boarding gate area. As another example, if the operations area 104 is a de-icing area remote from an aircraft boarding gate area, the edge computing device 106 may be installed on a de-icing truck.

In some embodiments, the edge computing device 106 communicates with a model management computing system 102. The model management computing system 102 may include one or more computing devices configured to provide the components of the model management computing system 102 as described further below. Any suitable types of computing devices may be used to provide the model management computing system 102, including but not limited to server computing devices, desktop computing devices, laptop computing devices, tablet computing devices, and computing devices of a cloud computing system.

In some embodiments, the edge computing device 106 may be situated in a geographically remote location without wired network access to the Internet. Geographic reach may be especially important in various operations areas 104 related to airports, as the large distances involved may complicate the use of simpler, higher bandwidth technologies such as Wi-Fi or wired ethernet. As shown, the edge computing device 106 may communicate with the model management computing system 102 wirelessly via a cell site 110 to take advantage of the larger geographic reach of cellular data networks.

Though cellular data networks do offer a large geographic reach, providers of cell sites 110 often throttle bandwidth once a relatively low monthly data cap is reached. That is, a connection to a cell site 110 may use 4G technology that is theoretically capable of upload speeds of 8 Mbps to 50 Mbps, but the provider of the cell site 110 may throttle the bandwidth to 2G upload speeds of 128 Kbps after a data cap is reached.

In order to overcome the limitations of the low bandwidth provided by cell sites 110, the system 100 may use a plurality of modems to increase the overall bandwidth available for communication with the model management computing system 102. In the illustrated embodiment, the edge computing device 106 uses a first modem 112, a second modem 114, and a third modem 116 to communicate with the model management computing system 102, though in other embodiments more or fewer modems may be used. The cost of many separate connections to the cell site 110 that are subject to data caps and bandwidth throttling is typically much lower than the cost of a single connection to the cell site 110 at uncapped high bandwidth, and so is preferable despite the complication of dealing with throttled bandwidth. In some embodiments, the edge computing device 106 may process data streams from the cameras 108 and the equipment devices 118 to fit within the reduced bandwidth available from the plurality of modems, and may generate combined data streams for transmission using these low-bandwidth connections as described in further detail below.

That said, in some embodiments, other wireless or wired communication techniques (including but not limited to Wi-Fi, WiMAX, or satellite internet) may be used to communicate between the edge computing device 106 and the model management computing system 102. Further, in some embodiments, direct live communication between the edge computing device 106 and the model management computing system 102 may not be available. Instead, in such embodiments, the edge computing device 106 and model management computing system 102 may communicate periodically. For example, the edge computing device 106 may periodically be removed from an installed location to be synchronized with the model management computing system 102 via a wired connection. As another example, the edge computing device 106 and model management computing system 102 may exchange data via a removable computer-readable medium, including but not limited to a flash drive, floppy disk, hard drive, CD-ROM, or DVD-ROM.

Though a single edge computing device 106 and a single operations area 104 is illustrated for the sake of simplicity, this is a non-limiting example embodiment only. In some embodiments, a single model management computing system 102 may be associated with multiple operations areas 104. Further, in some embodiments, a single operations area 104 may be associated with more than one edge computing device 106 and/or more than one camera 108 and/or more than one equipment device 118.

Figure 2:
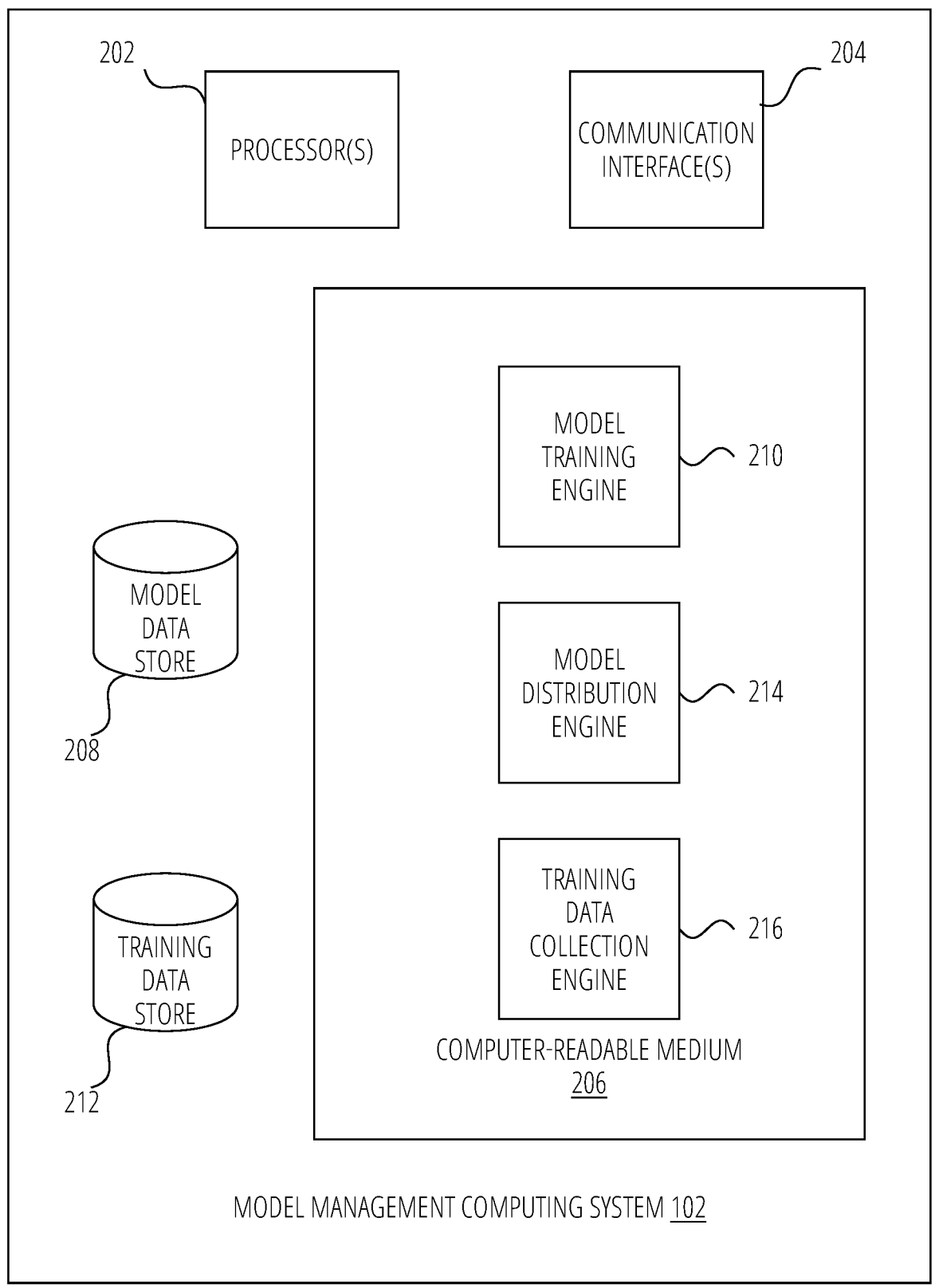
FIG. 2 is a block diagram that illustrates aspects of a non-limiting example embodiment of a model management computing system according to various aspects of the present disclosure.

FIG. 2 is a block diagram that illustrates aspects of a non-limiting example embodiment of a model management computing system according to various aspects of the present disclosure. The illustrated model management computing system 102 may be implemented by any computing device or collection of computing devices, including but not limited to a desktop computing device, a laptop computing device, a mobile computing device, a server computing device, a computing device of a cloud computing system, and/or combinations thereof. In some embodiments, the model management computing system 102 is configured to receive images from one or more edge computing devices 106, to generate training data based on the received images, and to train one or more machine learning models to identify apparatuses in the images. In some embodiments, the model management computing system 102 is also configured to distribute trained machine learning models to edge computing devices 106 for use.

As shown, the model management computing system 102 includes one or more processors 202, one or more communication interfaces 204, a model data store 208, a training data store 212, and a computer-readable medium 206.

In some embodiments, the processors 202 may include any suitable type of general-purpose computer processor. In some embodiments, the processors 202 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 204 include one or more hardware and or software interfaces suitable for providing communication links between components. The communication interfaces 204 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof. For example, the communication interfaces 204 may include at least one interface suitable for receiving information from one or more edge computing devices 106 transmitted by the edge computing devices 106 via a low-bandwidth connection between the edge computing devices 106 and a cell site 110.

As shown, the computer-readable medium 206 has stored thereon logic that, in response to execution by the one or more processors 202, cause the model management computing system 102 to provide a model training engine 210, a model distribution engine 214, and a training data collection engine 216.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the model training engine 210 is configured to train machine learning models using training data stored in the training data store 212. In some embodiments, the model training engine 210 is also configured to store trained machine learning models in the model data store 208. In some embodiments, the training data collection engine 216 is configured to receive images from edge computing devices 106 and to use the images to generate training data. In some embodiments, the training data collection engine 216 stores the generated training data in the training data store 212. In some embodiments, the model distribution engine 214 is configured to transmit trained machine learning models from the model data store 208 to edge computing devices 106.

Further description of the configuration of each of these components is provided below.

The model management computing system 102 is primarily described herein as being used to collect images from videos from edge computing devices 106 in order to train and distribute machine learning models usable by the edge computing devices 106. However, because the model management computing system 102 receives data streams from the edge computing devices 106, the model management computing system 102 may use the data streams for many other purposes. For example, in some embodiments the model management computing system 102 (or another system that receives collected data streams from the model management computing system 102) may provide centralized monitoring and management of the monitored operations areas 104. The model management computing system 102 can thus provide on-demand streams of video, images, telemetry, or video/images with telemetry superimposed thereon to client computing devices such as mobile computing devices, desktop computing devices, and so on. Telemetry overlays may include telemetry information provided by the edge computing devices 106 directly from the equipment devices 118, and/or may include conditions detected by the edge computing devices 106 using the machine learning models described herein.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. For example, in some embodiments, a cloud service such as Google Cloud Storage may be used as a data store. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 3:
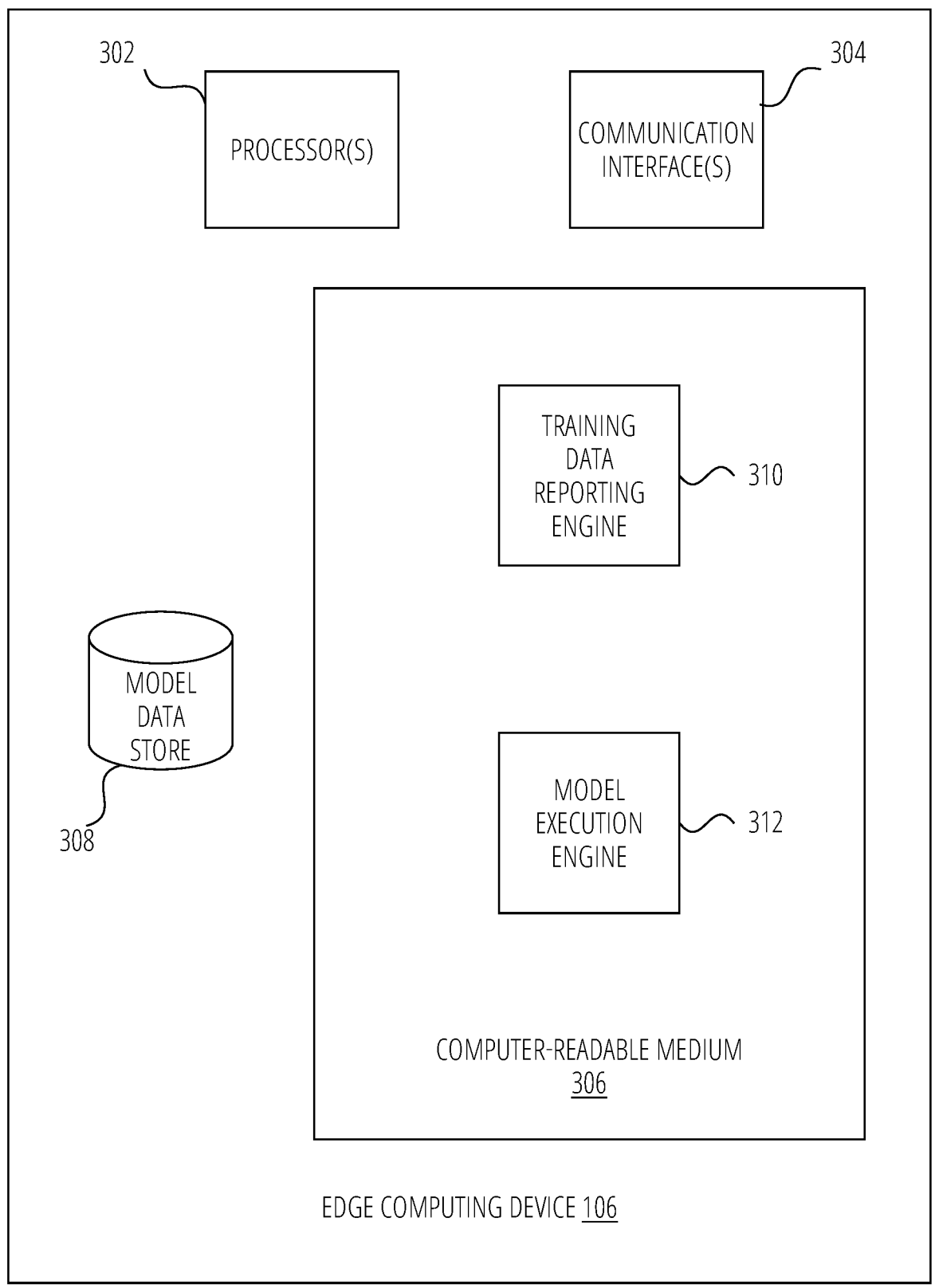
FIG. 3 is a block diagram that illustrates aspects of a non-limiting example embodiment of an edge computing device according to various aspects of the present disclosure.

FIG. 3 is a block diagram that illustrates aspects of a non-limiting example embodiment of an edge computing device according to various aspects of the present disclosure. The illustrated edge computing device 106 may be implemented by any computing device or collection of computing devices, including but not limited to a desktop computing device, a laptop computing device, a mobile computing device, a server computing device, a computing device of a cloud computing system, and/or combinations thereof. The edge computing device 106 is configured to receive images from one or more cameras 108, to transmit the images to a model management computing system 102 for generation of training data, to receive trained machine learning models from the model management computing system 102, to use the trained machine learning models to detect apparatuses within the operations area 104, and to control one or more devices based on the detected apparatuses.

As shown, the edge computing device 106 includes one or more processors 302, one or more communication interfaces 304, a model data store 308, and a computer-readable medium 306.

In some embodiments, the processors 302 may include any suitable type of general-purpose computer processor. In some embodiments, the processors 302 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 304 include one or more hardware and or software interfaces suitable for providing communication links between components. The communication interfaces 304 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof. Typically, the communication interfaces 304 include at least one low-bandwidth, long-distance wireless communication interface, such as a 2G, 3G, 4G, 5G, or LTE interface, for communication with the model management computing system 102.

As shown, the computer-readable medium 306 has stored thereon logic that, in response to execution by the one or more processors 302, cause the edge computing device 106 to provide a training data reporting engine 310, and a model execution engine 312. In some embodiments, the training data reporting engine 310 is configured to transmit images from one or more cameras 108 to the model management computing system 102 for the creation of training data. In some embodiments, the model execution engine 312 is configured to receive trained machine learning models, store the models and retrieve the models using the model data store 308, and to execute the models on new images received from the one or more cameras 108.

Further description of the configuration of each of these components is provided below.

Figure 4A:
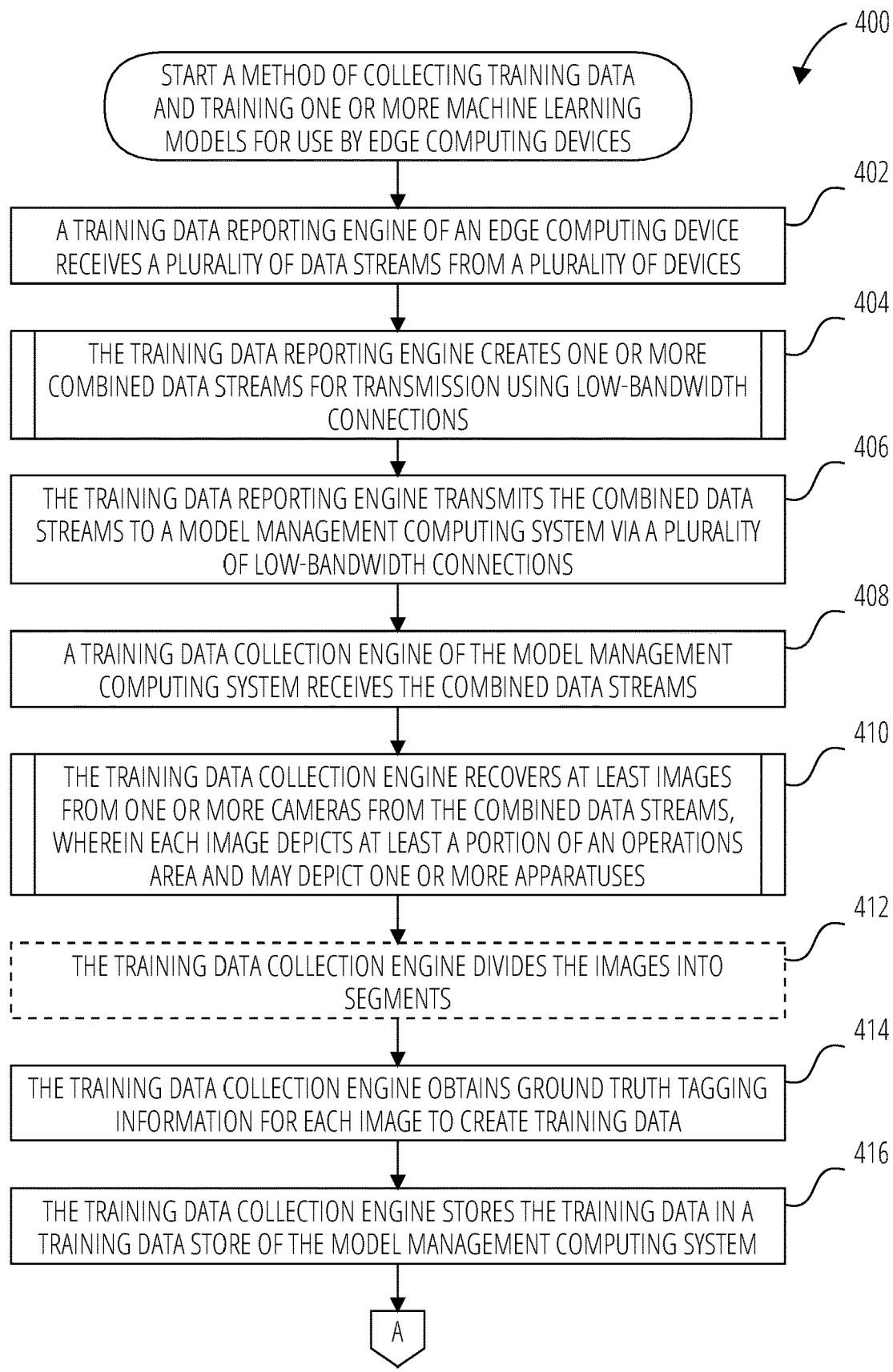
FIG. 4A and FIG. 4B are a flowchart that illustrates a non-limiting example embodiment of a method of collecting training data and training one or more machine learning models for use by edge computing devices according to various aspects of the present disclosure.
Figure 4B:
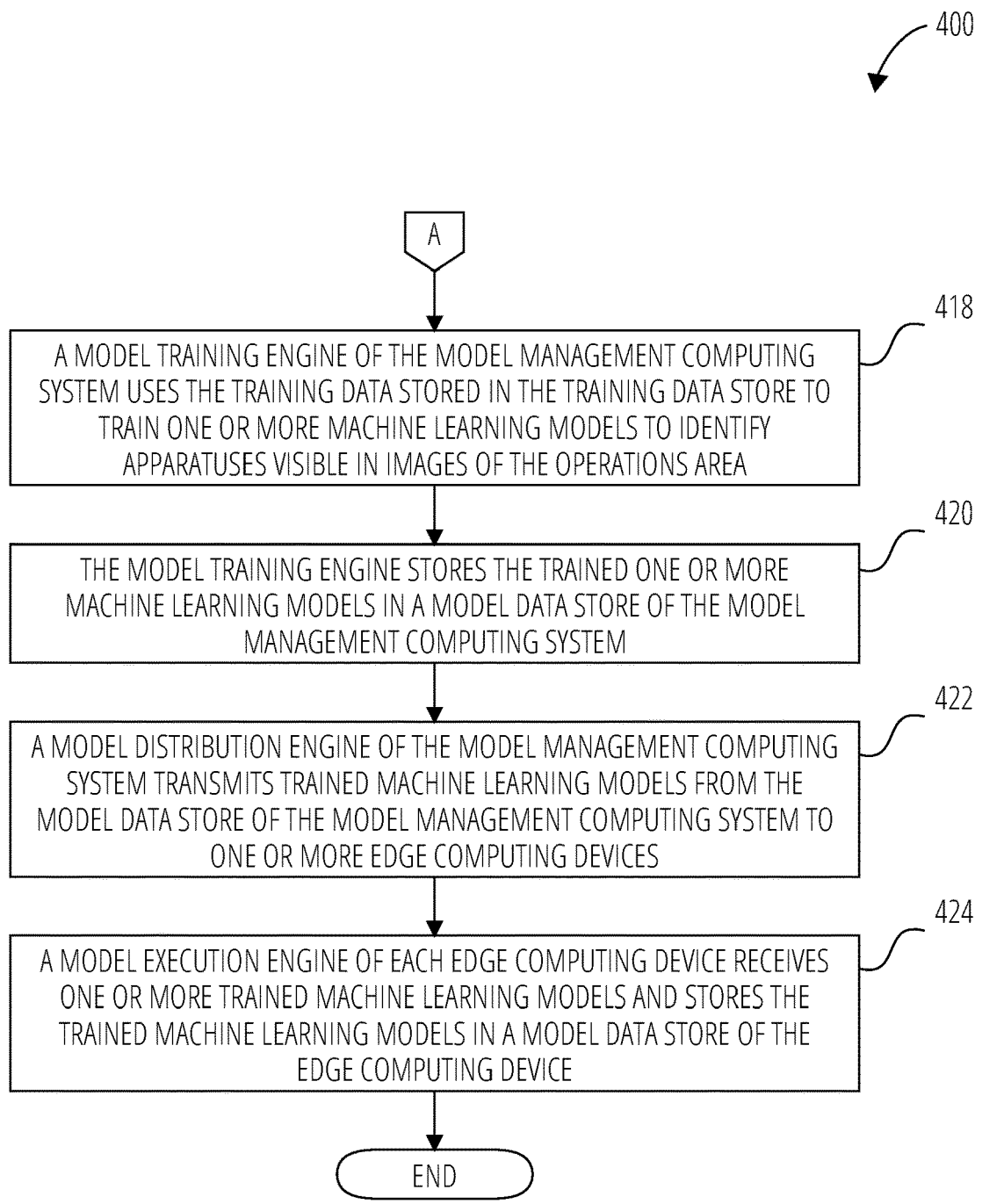

FIG. 4A and FIG. 4B are a flowchart that illustrates a non-limiting example embodiment of a method of collecting training data and training one or more machine learning models for use by edge computing devices according to various aspects of the present disclosure. In the method 400, the model management computing system 102 collects images from edge computing devices 106 via low-bandwidth connections, obtains annotations for apparatuses within the images, and trains machine learning models using the collected images and annotations.

From a start block, the method 400 proceeds to block 402, where training data reporting engines 310 of one or more edge computing devices 106 receive a plurality of data streams from a plurality of devices. The plurality of data streams include data streams from one or more cameras 108 that include images. In some embodiments, the plurality of data streams may also include data streams from one or more equipment devices 118.

Each camera 108 is positioned to view at least a portion of an operations area 104, and so each image depicts at least a portion of an operations area 104. Each image may also depict one or more apparatuses within the operations area 104, if present. In some embodiments, the images may be received by an edge computing device 106 as part of an MJPEG, MPEG-4, or other format video stream generated using a variable-bandwidth codec and transmitted by the cameras 108 to the edge computing device 106. In some embodiments, the images may be stored by the cameras 108 and requested by the edge computing device 106.

In some embodiments, the cameras 108 may be positioned in order to obtain images of the operations area 104 that will be useable to determine desired statuses of apparatuses within the operations area 104. For example, a camera 108 may be positioned inside of a passenger boarding bridge, and may have an opening of the passenger boarding bridge within its field of view so that the presence, absence, and status of an aircraft can be determined; the state of apparatuses associated with the passenger boarding bridge (including but not limited to an auto level wheel) can be determined; the presence, absence, and status of passengers or crew using the passenger boarding bridge can be determined; etc. FIG. 8A-FIG. 8D illustrate non-limiting example embodiments of images obtained by a camera 108 positioned inside of a passenger boarding bridge, and will be discussed in further detail below.

As another example, a camera 108 may be positioned on a terminal building, a tower, or another location that has an exterior view of an aircraft boarding gate area so that the presence, absence, and status of an aircraft can be determined; the presence, absence, and state of ground service vehicles in the aircraft boarding gate area can be determined; etc. FIG. 9A-FIG. 9D illustrate non-limiting example embodiments of images obtained by a camera 108 positioned with an exterior view of an aircraft boarding gate area, and will be discussed in further detail below.

In other examples, cameras 108 may be positioned elsewhere in order to obtain views of other types of apparatuses and/or other types of operations areas 104. For instance, in some embodiments, a camera 108 may be positioned on a de-icing truck or an aircraft hangar.

In subroutine block 404, the training data reporting engines 310 creates one or more combined data streams for transmission using low-bandwidth connections. Any suitable technique may be used to create the combined data stream. In some embodiments, the amount of compression or other size reduction provided at subroutine block 404 may be adjustable based on the amount of bandwidth available for this communication link during a given communication. For example, a total bandwidth available through all of the modems coupled to the edge computing device 106 may be divided by the number of data streams to be combined, and each data stream may be reduced in size so that the total fits in the available bandwidth. In some embodiments, the number of modems coupled to the edge computing device 106 may be adjusted to accommodate a desired amount of bandwidth. For example, a video data stream from a camera 108 may be downsampled to fit within 64 Kbps of transmission bandwidth, thus allowing two video data streams to be transmitted via a single 128 Kbps modem connection. If video data streams from more than two cameras 108 are desired to be supported, additional modems can be added to the system 100.

Figure 5:
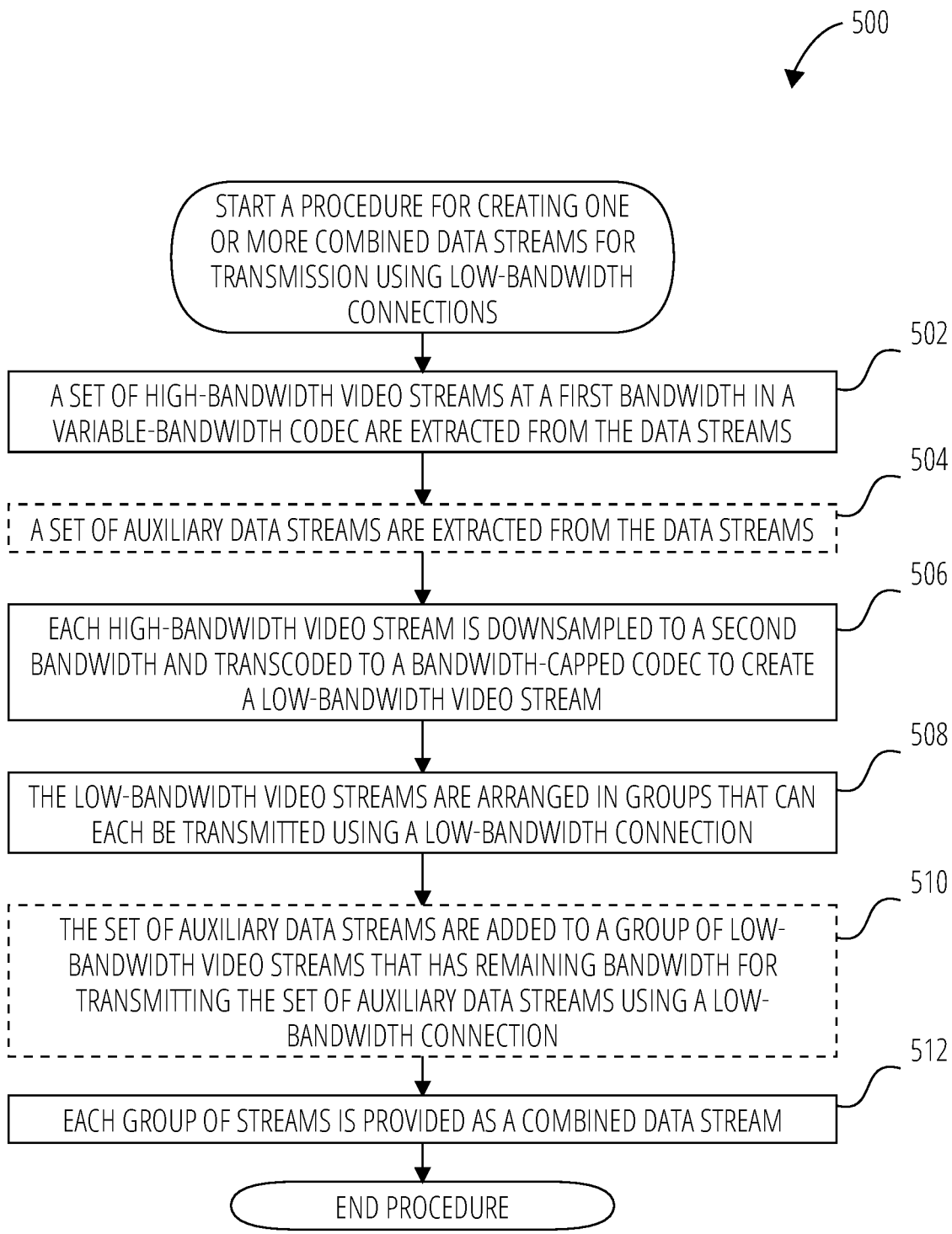
FIG. 5 is a flowchart that illustrates a non-limiting example embodiment of a procedure for creating a combined data stream for transmission using low-bandwidth connections according to various aspects of the present disclosure.

One non-limiting example embodiment of a procedure for creating a combined data stream for transmission is illustrated in FIG. 5 and described in further detail below. In some embodiments, procedures different from or in addition to the technique illustrated in FIG. 5 could be used to create the combined data stream to compensate for the reduced bandwidth available in the communication link between the edge computing devices 106 and the model management computing system 102.

In block 406, the training data reporting engines 310 transmit the combined data streams to a model management computing system 102 via a plurality of low-bandwidth connections. Though some embodiments may use high-bandwidth connections for the communication between the edge computing device 106 and the model management computing system 102, the combination of low-bandwidth connections along with the use of bandwidth-conserving techniques as described in subroutine block 404 provide various technical benefits with regard to improved reliability, improved geographic reach, and reduced cost.

Figure 6:
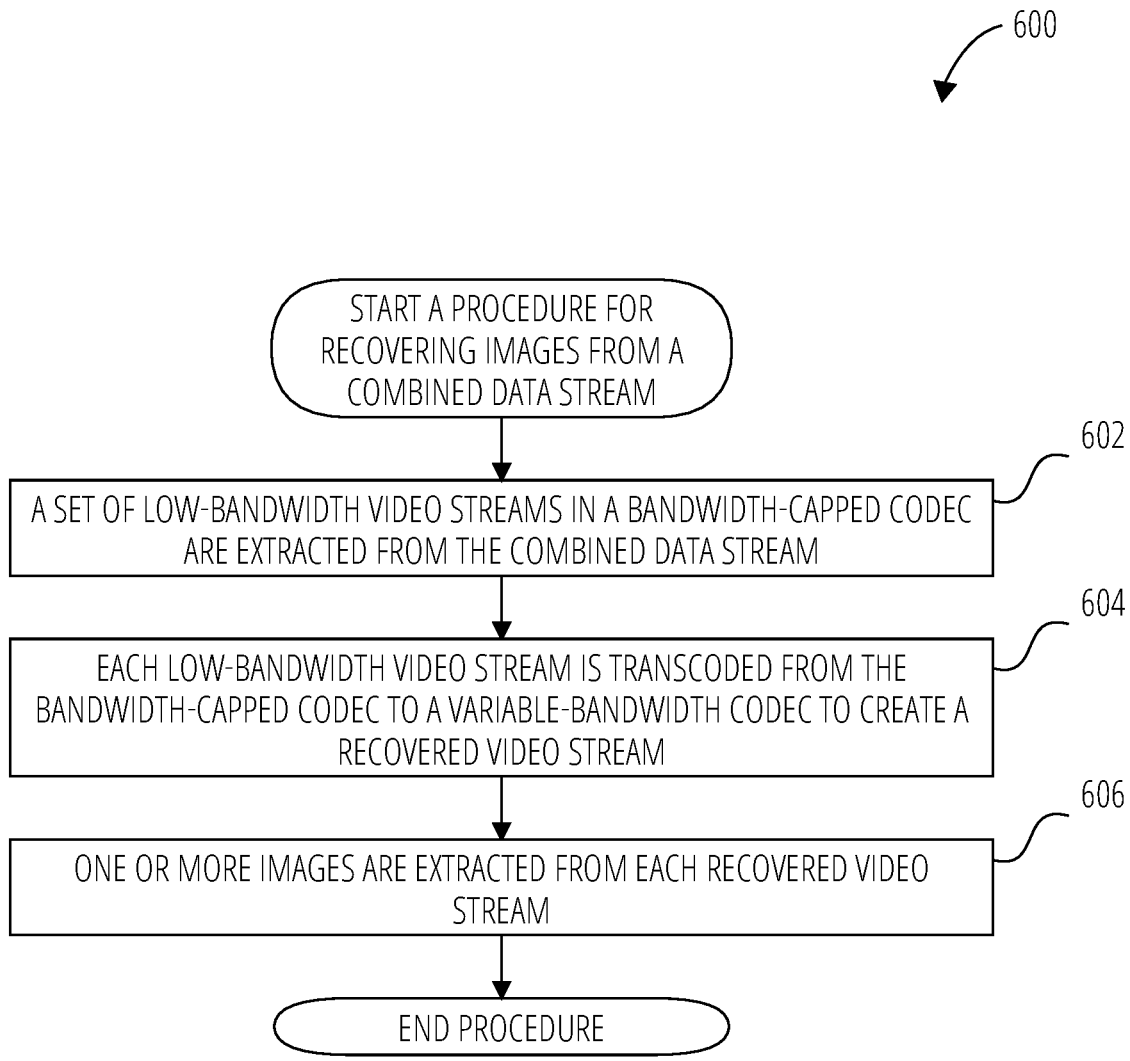
FIG. 6 is a flowchart that illustrates a non-limiting example embodiment of a procedure 600 for recovering images from a combined data stream according to various aspects of the present disclosure.

In block 408, a training data collection engine 216 of the model management computing system 102 receives the combined data streams, and in subroutine block 410, the training data collection engine 216 recovers at least images from one or more cameras 108 from the combined data streams, wherein each image depicts at least a portion of an operations area and may depict one or more apparatuses. In some embodiments, the training data collection engine 216 may store the images in a model data store 208 of the model management computing system 102. Any suitable technique may be used to recover at least the images from the combined data streams. FIG. 6 illustrates one non-limiting example embodiment of a procedure for recovering at least images from a combined data stream, and is discussed in further detail below.

In optional block 412, the training data collection engine 216 divides the images into segments. In some embodiments, an apparatus may be present in a predictable location within images from a given camera 108. Accordingly, more effective machine learning models may be trained and used if only the relevant portion of the image is provided to the machine learning model for training and use. By dividing the images into such segments, these benefits can be achieved.

FIG. 8A-FIG. 8D provide an example of such images. As mentioned above, these figures illustrate non-limiting example from a camera 108 positioned within a passenger boarding bridge with a view of the opening of the passenger boarding bridge. The interior bridge camera view 802 shows the bridge floor 804, the area visible through the bridge opening 806, the bridge cowling 808 that couples to the aircraft, and an auto level wheel 810 in a stowed position. The auto level wheel 810 is a control apparatus that, when an aircraft is present, helps automatically maintain the vertical relationship between the passenger boarding bridge and the door of the aircraft so that the door of the aircraft does not contact the bridge floor 804 or any other portion of the passenger boarding bridge as the weight of the aircraft changes.

Figure 8A:
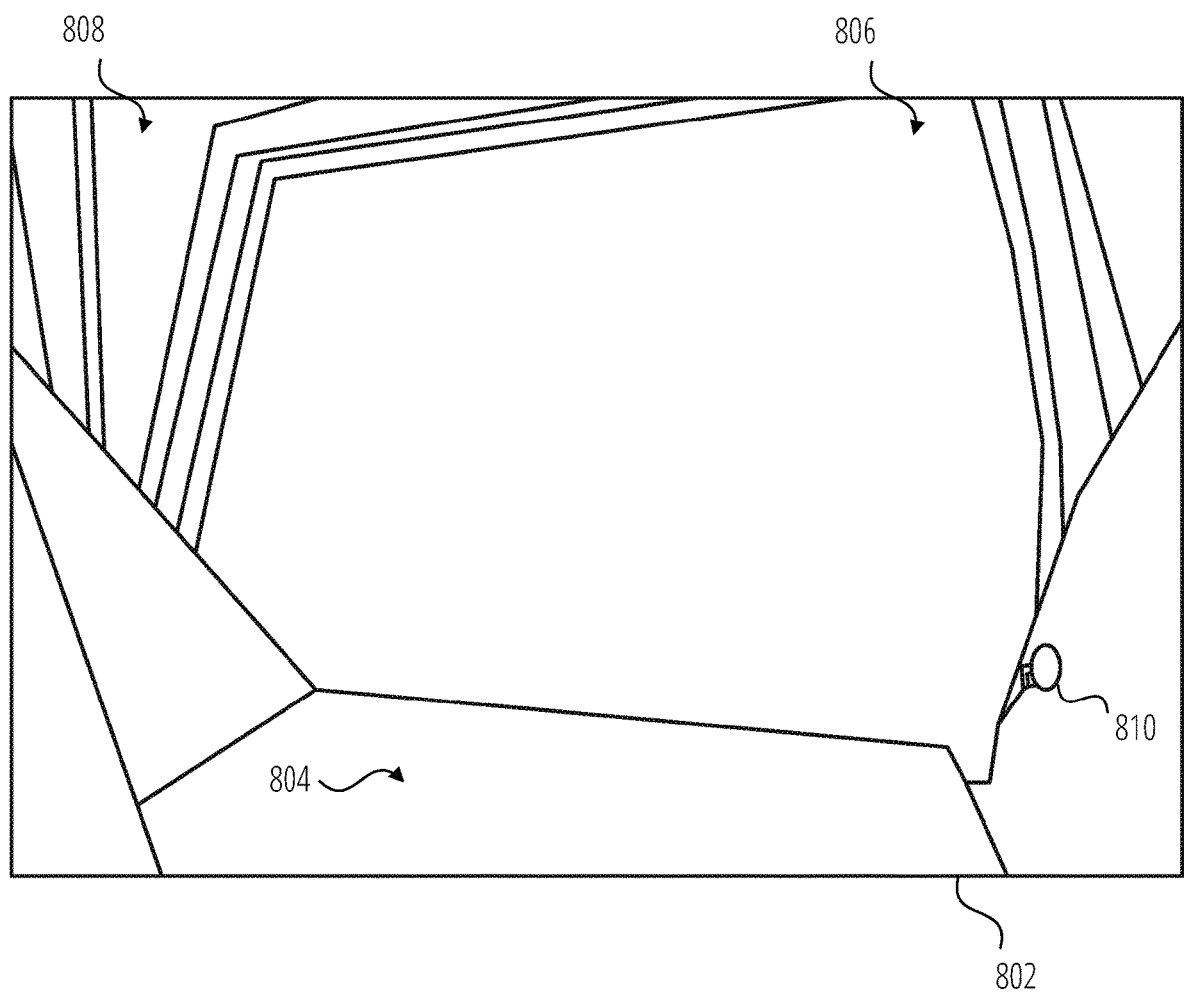
FIG. 8A-FIG. 8D illustrate non-limiting example embodiments of images obtained by a camera positioned inside of a passenger boarding bridge according to various aspects of the present disclosure.
Figure 8B:
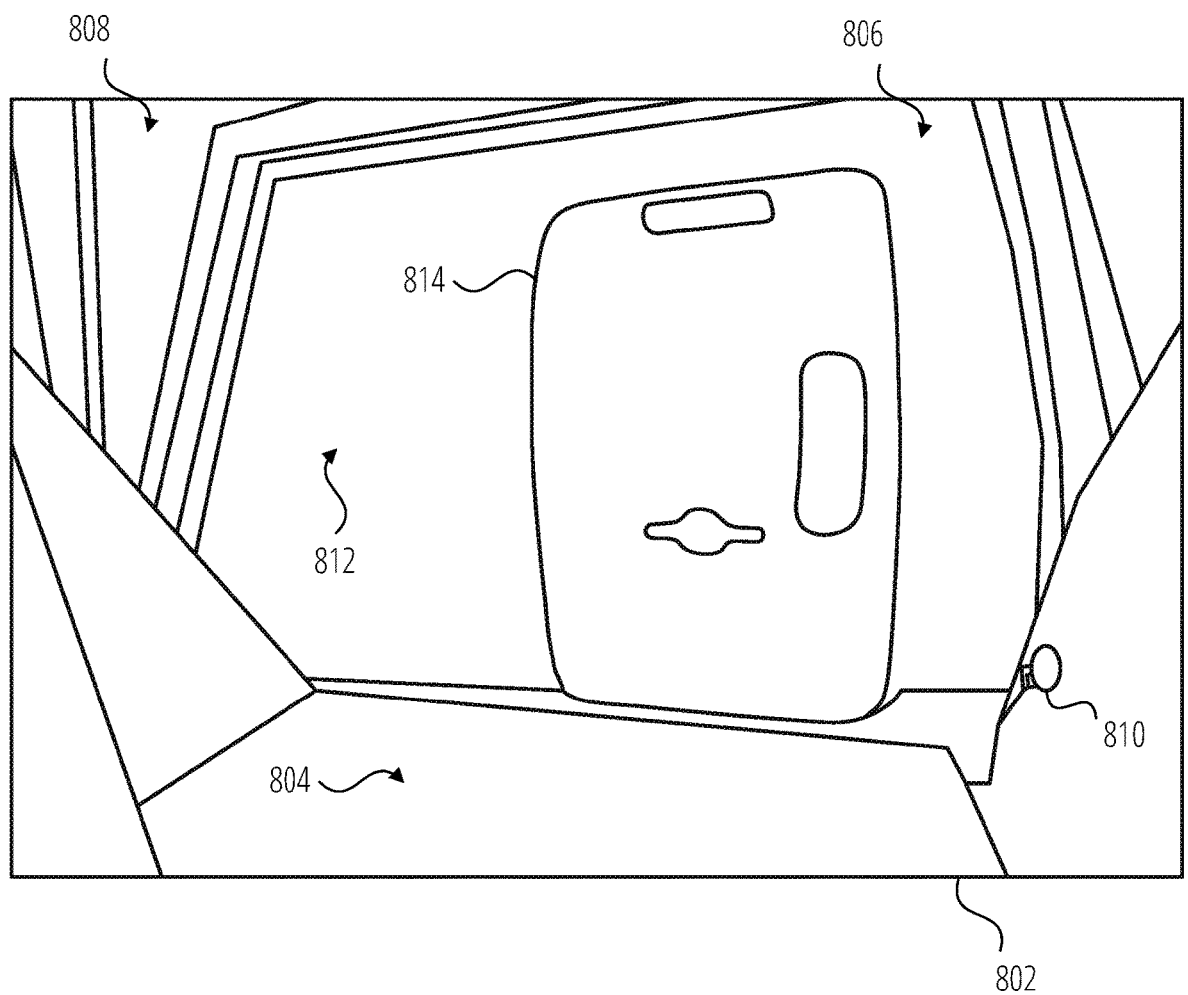
Figure 8C:
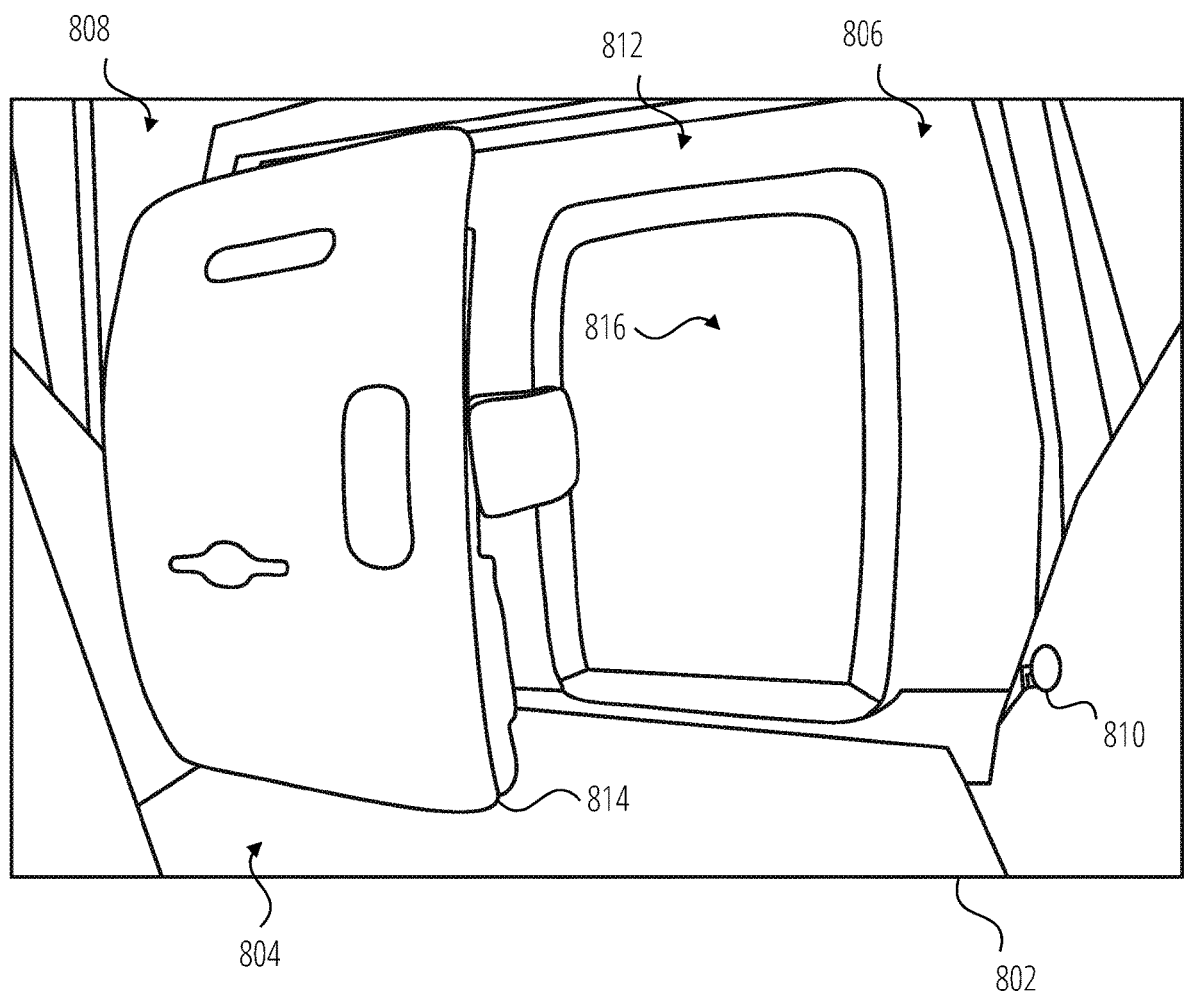
Figure 8D:
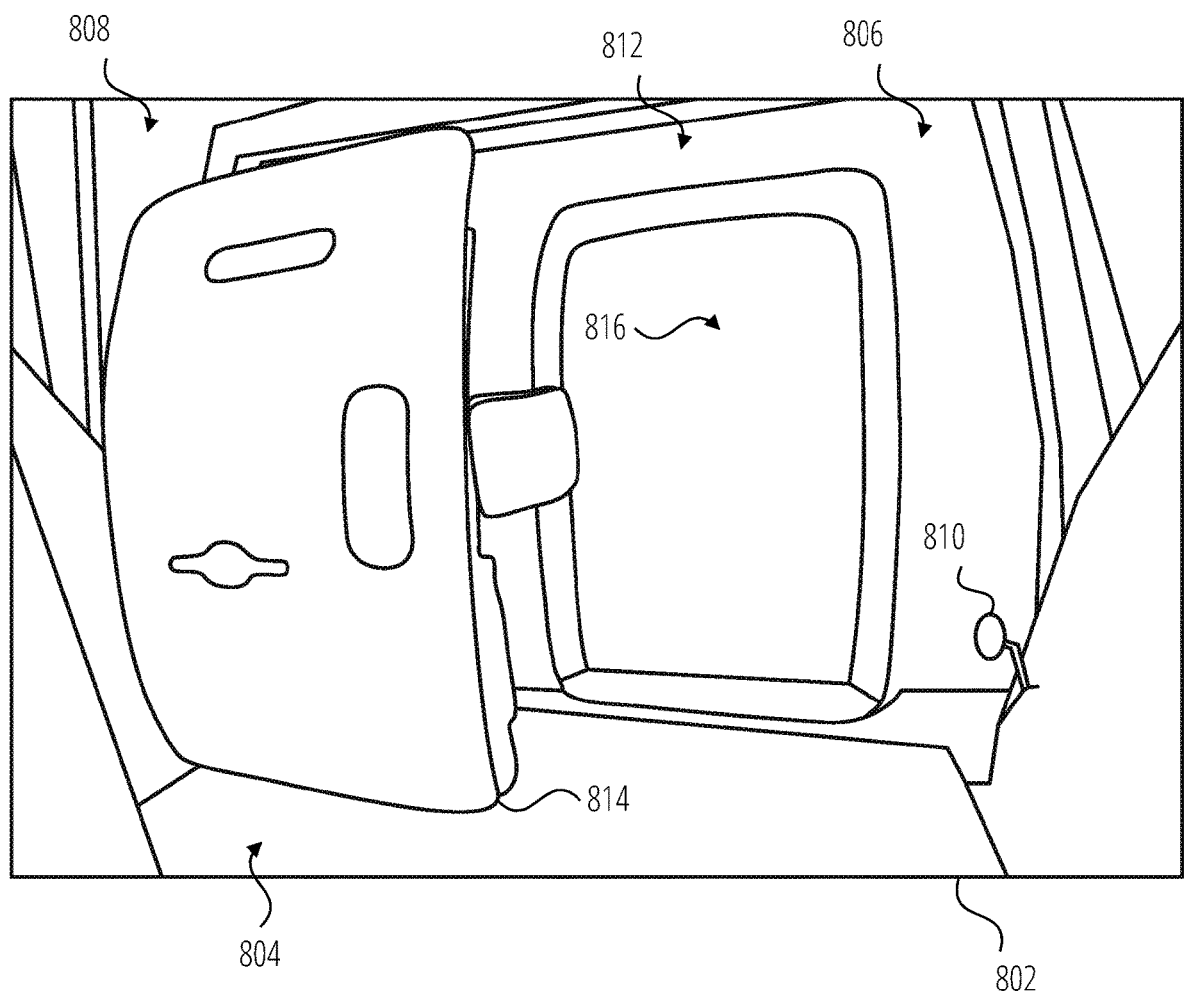

In FIG. 8A, no aircraft is present, and so nothing is depicted as being visible through the bridge opening 806. Naturally, in an actual interior bridge camera view 802, various background elements may be visible through the bridge opening 806 in the absence of an aircraft, but FIG. 8A lacks these features for the sake of simplicity. In FIG. 8B, an aircraft 812 is present at the aircraft boarding gate area, and so is visible through the bridge opening 806. An aircraft door 814 is shown in FIG. 8B as closed. In FIG. 8C, the aircraft door 814 is open, and the aircraft interior 816 is visible. Notably, in FIG. 8C, the auto level wheel 810 remains in the stowed position. In FIG. 8D, the auto level wheel 810 is in a deployed position.

In some embodiments, a suitable segmentation of the interior bridge camera view 802 may include creating a first segment limited to a portion of the lower right corner of the interior bridge camera view 802, such that the auto level wheel 810 occupies a large amount of the first segment in its stowed and/or deployed position. Since the location of the auto level wheel 810 is highly predictable with respect to the interior bridge camera view 802, a segment may be cropped to include only the stowed and/or deployed position of the auto level wheel 810. Another suitable example segment may be cropped to the bridge opening 806 or a portion thereof. Yet another suitable example segment may be cropped to a location of the aircraft door 814 in one or more of the closed or open position.

Figure 9A:
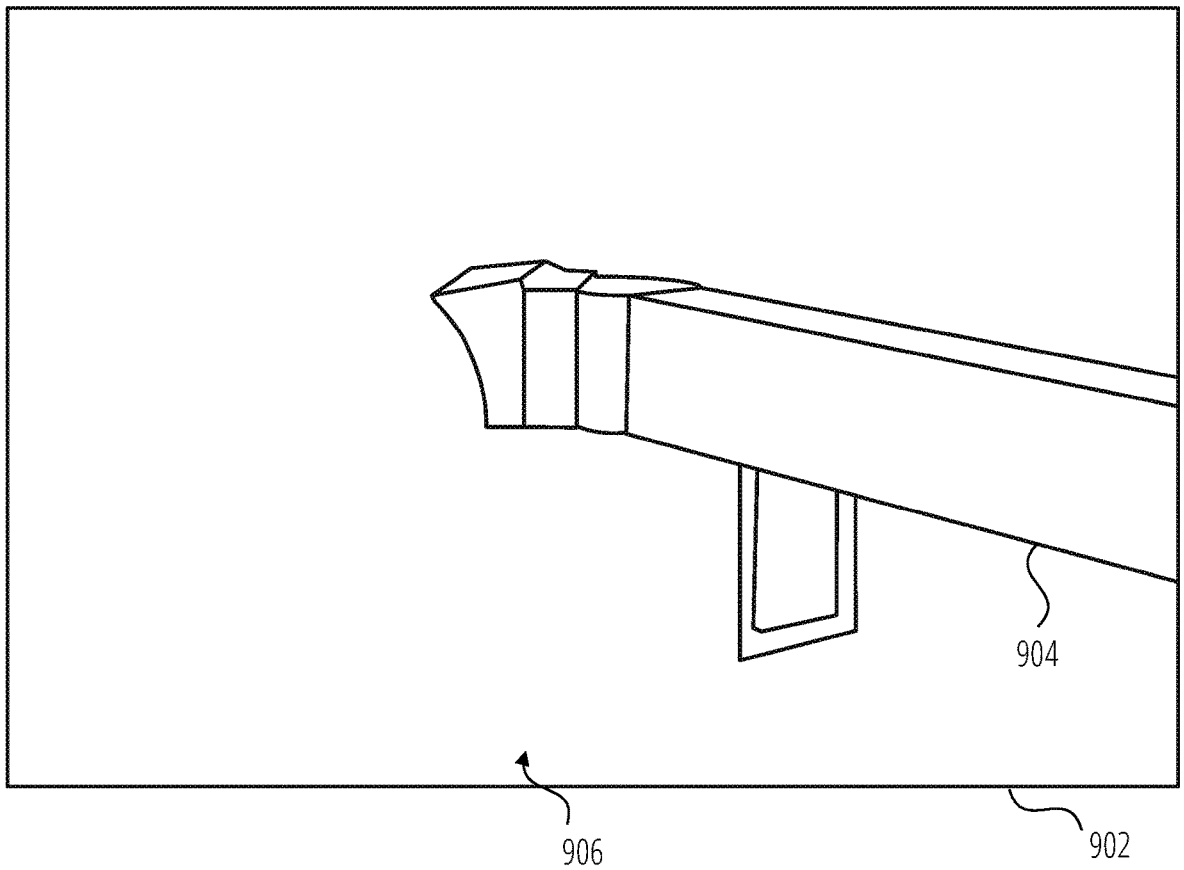
FIG. 9A-FIG. 9D illustrate non-limiting example embodiments of images obtained by a camera positioned with an exterior view of an aircraft boarding gate area according to various aspects of the present disclosure.
Figure 9B:
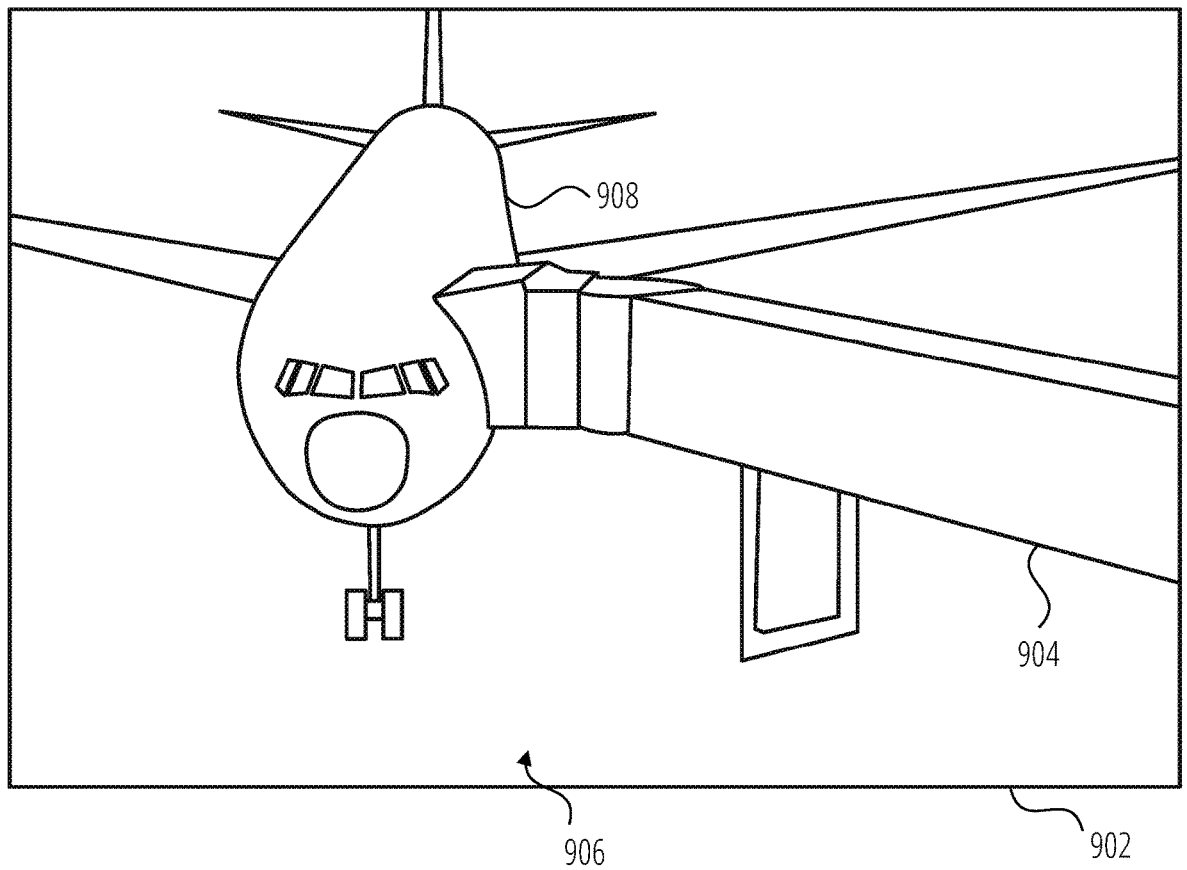
Figure 9C:
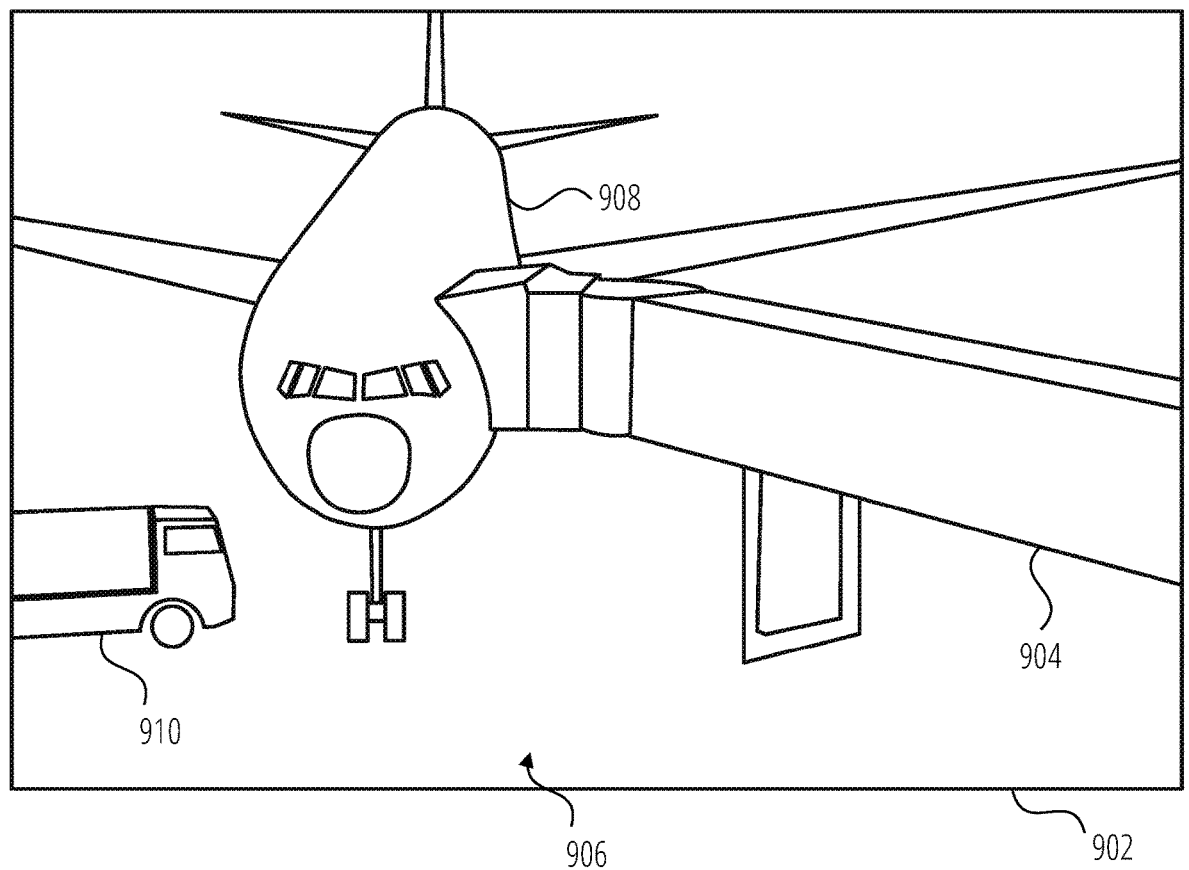
Figure 9D:
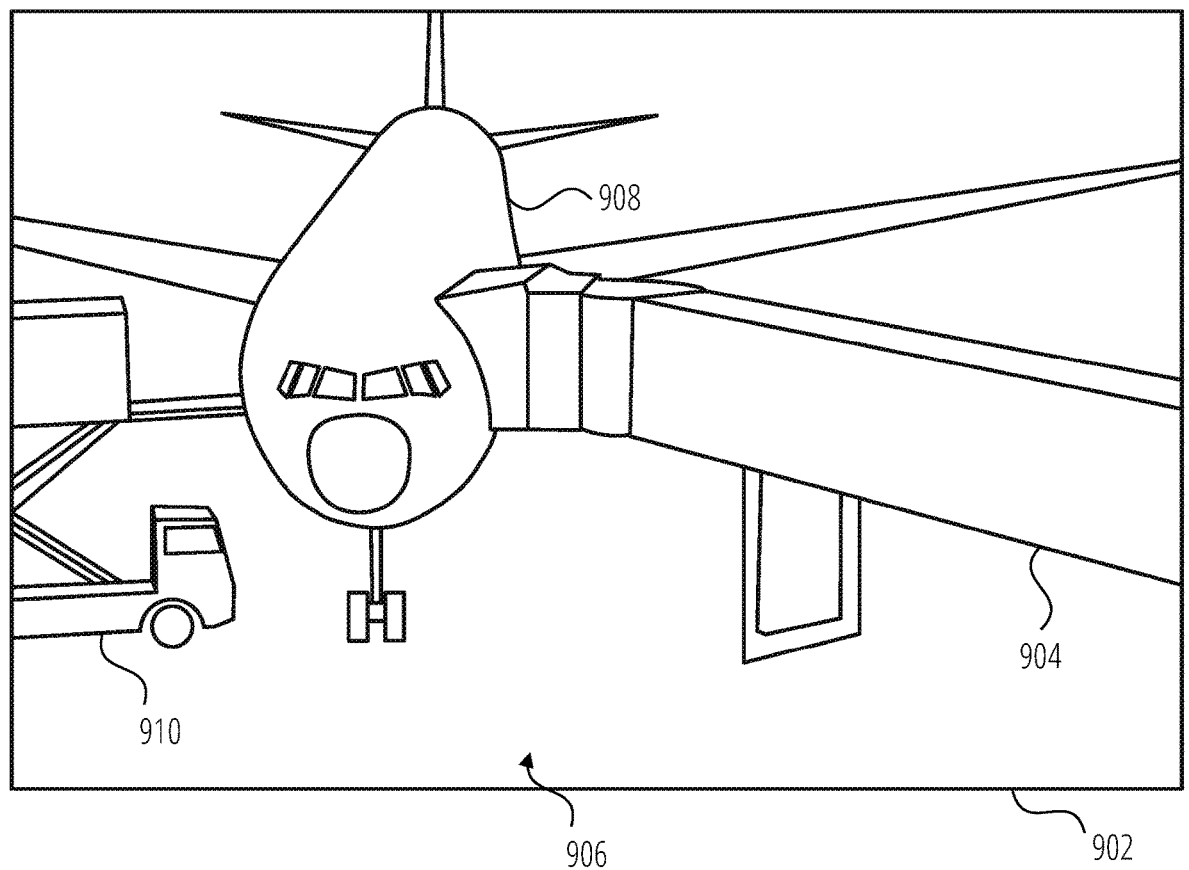

FIG. 9A-FIG. 9D provide another example of such images. As mentioned above, FIG. 9A-FIG. 9D show images obtained by a camera 108 positioned with an exterior view of an aircraft boarding gate area. In FIG. 9A, the exterior gate camera view 902 includes a passenger boarding bridge 904 and an operations area 906, but no aircraft or ground service vehicles are present in the operations area 906. In FIG. 9B, an aircraft 908 is present in the operations area 906, and the passenger boarding bridge 904 is coupled to the aircraft 908. In FIG. 9C, a ground service vehicle 910 is present in the operations area 906. The illustrated ground service vehicle 910 is a catering supply vehicle, and in FIG. 9C a cargo area of the ground service vehicle 910 is shown in a retracted position. In FIG. 9D, the cargo area of the ground service vehicle 910 is shown in an extended position.

In some embodiments, a suitable segmentation of the exterior gate camera view 902 may include creation of a first segment limited to a center portion of the exterior gate camera view 902, such that the aircraft 908 fills the majority of the first segment when present. Another suitable example segment may be a lower left portion of the exterior gate camera view 902, such that the ground service vehicle 910 takes up a majority of the segment.

In block 414, the training data collection engine 216 obtains ground truth tagging information for each image to create training data. In some embodiments, the training data collection engine 216 may present a user interface to a data entry operator who will view each image and/or image segment and determine one or more ground truth tags for one or more apparatuses visible in the image and/or image segment, and/or statuses of one or more apparatuses visible in the image and/or image segment. To provide a ground truth tag, the data entry operator may use the user interface to indicate a portion of the image and/or image segment that depicts an apparatus, the apparatus that is depicted, and potentially a status of the apparatus.

In some embodiments, the training data collection engine 216 may use other sources of data to generate additional ground truth tags other than those entered by the data entry operator, or may use other sources of data to improve the user interface presented to the data entry operator. For example, the training data collection engine 216 may obtain data indicating a time at which an aircraft arrived in an operations area and a time at which the aircraft left the operations area, and may automatically tag images obtained between those times as having an aircraft present. Naturally, this could be performed for any apparatus or apparatus status for which data can be obtained.

In some embodiments, the training data collection engine 216 may use ground truth tagging information obtained for some images to infer ground truth tagging information for other related images. For example, images obtained from an interior bridge camera view 802 and an exterior gate camera view 902 for the same operations area at the same time should depict the same ground truth. So, if an image from the interior bridge camera view 802 is tagged as depicting an aircraft, the training data collection engine 216 may infer that an image from the exterior gate camera view 902 at the same time should have a matching ground truth tag added.

As another example, the training data collection engine 216 may infer that, for states that are unlikely to change quickly (e.g., the presence or absence of an apparatus such as an aircraft or a ground service vehicle), if an image obtained at a first time is tagged as depicting the apparatus, and an image obtained at a second time later than the first time is also tagged as depicting the apparatus, the training data collection engine 216 may infer that images obtained between the first time and the second time should also be tagged as depicting the apparatus. This technique may be particularly useful for images that are obtained from a video stream, as the ground truth tags may be manually obtained at a rate lower than the frame rate of the video (e.g., one tag every 10 seconds), and ground truth tags for frames between the manual ground truth tags may be inferred. In this way, the training data collection engine 216 may generate more ground truth training examples than are manually tagged by the data entry operator, thus increasing the size of the training set and the quality of the machine learning model.

As yet another example, the training data collection engine 216 may use a previously trained or partially trained version of a machine learning model to generate potential ground truth tags associated with images and/or image segments. The user interface provided by the training data collection engine 216 may then present the image/image segments and the potential ground truth tags, and the data entry operator may confirm or correct the potential ground truth tags to generate the ground truth tags.

In some embodiments, the training data collection engine 216 may collect bulk training data instead of presenting single images and/or image segments in a user interface. For example, the training data collection engine 216 may accept an image folder and a structured format text file (such as a CSV or XML file) that supplies ground truth tags for the images in the image folder.

In block 416, the training data collection engine 216 stores the training data in a training data store 212 of the model management computing system 102. In some embodiments, the training data collection engine 216 may use the training data store 212 to store records that associate a given image and/or given image segment with the ground truth tags determined by the training data collection engine 216.

The method 400 then proceeds to a continuation terminal ("terminal A") From terminal A (FIG. 4B), the method 400 proceeds to block 418, where a model training engine 210 of the model management computing system 102 uses the training data stored in the training data store 212 to train one or more machine learning models to identify apparatuses visible in images of the operations area 104. Any suitable type of machine learning model may be used, including but not limited to convolutional neural networks. Any suitable technique may be used to train the machine learning models, including but not limited to one or more of gradient descent, data augmentation, hyperparameter tuning, and freezing/unfreezing of model architecture layers. In some embodiments, the raw images are used as the training input. In some embodiments, one or more features derived from the images, including but not limited to versions of the images in a transformed color space, set of edges detected in the image, one or more statistical calculations regarding the overall content of the images, or other features derived from the images may be used instead of or in addition to the raw images to train the machine learning models.

In block 420, the model training engine 210 stores the trained one or more machine learning models in a model data store 208 of the model management computing system 102. Though the method 400 illustrates the machine learning models as being trained and then stored in the model data store 208 a single time, in some embodiments, trained machine learning models may be retrieved from the model data store 208 by the model training engine 210, retrained on new training data from the training data store 212, and re-stored in the model data store 208.

In block 422, a model distribution engine 214 of the model management computing system 102 transmits trained machine learning models from the model data store 208 of the model management computing system 102 to one or more edge computing devices 106. In some embodiments, the model distribution engine 214 may transmit the machine learning models to the edge computing devices 106 via the low-bandwidth communication links that are used to collect the images to create the training data. In some embodiments, the model distribution engine 214 may transmit the machine learning models to the edge computing devices 106 via other techniques, including but not limited to via a wired or wireless connection to a maintenance device, an exchange of a removable computer-readable medium such as an optical disk or flash drive, installation of a non-removable computer-readable medium such as an internal hard drive, ROM, or firmware, or via any other suitable technique. In block 424, a model execution engine 312 of each edge computing device 106 receives one or more trained machine learning models and stores the trained machine learning models in a model data store 308 of the edge computing device 106.

In some embodiments, the model provided to a given edge computing device 106 may have been trained using images collected from the given edge computing device 106. In some embodiments, the model provided to a given edge computing device 106 may have been trained using images collected from other edge computing devices 106 connected to similarly situated cameras 108. For example, a first edge computing device 106 that is communicatively coupled to cameras 108 having a first interior bridge camera view 802 may receive a machine learning model trained using images received from other edge computing devices 106 communicatively coupled to cameras 108 having other, similar interior bridge camera views (e.g., a similar model passenger boarding bridge, a similar camera installation location and orientation).

In some embodiments, the one or more trained machine learning models may include machine learning models trained for different situations. For example, a first machine learning model may have been trained using images collected during the day, while a second machine learning model may have been trained using images collected at night. As another example, a first machine learning model may have been trained using images collected during first weather conditions (e.g., clear), and a second machine learning model may have been trained using images collected during second weather conditions (e.g., rain or snow). In some embodiments, separate machine learning models may be trained to recognize different types of apparatuses and/or states of apparatuses.

The method 400 then proceeds to an end block and terminates.

FIG. 5 is a flowchart that illustrates a non-limiting example embodiment of a procedure for creating one or more combined data streams for transmission using low-bandwidth connections according to various aspects of the present disclosure. The procedure 500 is a non-limiting example of a procedure suitable for use at subroutine block 404 of the method 400 illustrated and described above.

From a start block, the procedure 500 advances to block 502, where a set of high-bandwidth video streams at a first bandwidth in a variable-bandwidth codec are extracted from the data streams. As stated above, the variable-bandwidth codec may be H.264, H.265, or any other codec for which a strict cap on bandwidth cannot be established. Extracting the high-bandwidth video streams may simply constitute receiving the video streams from the cameras 108.

At optional block 504, a set of auxiliary data streams are extracted from the data streams. The auxiliary data streams may be data streams received from one or more equipment devices 118, including but not limited to telemetry information. Optional block 504 is illustrated as optional because in some embodiments, auxiliary data stream information is not processed.

At block 506, each high-bandwidth video stream is downsampled to a second bandwidth and transcoded to a bandwidth-capped codec to create a low-bandwidth video stream. Downsampling of the high-bandwidth video stream may include one or more of reducing a frame rate, reducing a color depth, reducing a resolution, increasing a compression ratio, or any other suitable technique for downsampling. A bandwidth-capped codec is a codec in which a strict bandwidth limit will respected. In some embodiments, VP9 may be used as a bandwidth-capped codec, though this example should not be seen as limiting. As discussed above, in some embodiments, the bandwidth limit for the low-bandwidth video stream may be set to 64 Kbps so that two video streams may be combined to be transmitted over a single 128 Kbps modem link to a cell site 110.

At block 508, the low-bandwidth video streams are arranged in groups that can each be transmitted using a low-bandwidth connection. In some embodiments, each low-bandwidth video stream may be capped to use a fraction of the bandwidth of a low-bandwidth connection, and each group may be created from a set of low-bandwidth video streams that would use the entirety of the bandwidth of the low-bandwidth connection. For example, each low-bandwidth video stream may be capped at using half of the bandwidth of a 128 Kbps connection, or 64 Kbps, and two such low-bandwidth video streams may be grouped together. If more than two low-bandwidth video streams are processed by the procedure 500, then more than one group may be created, and more than one low-bandwidth connection may be utilized.

At optional block 510, the set of auxiliary data streams are added to a group of low-bandwidth video streams that has remaining bandwidth for transmitting the set of auxiliary data streams using a low-bandwidth connection. In some embodiments, the set of auxiliary data streams may use a trivial amount of bandwidth, such that it can be added to a group of low-bandwidth video streams that would otherwise use the entirety of the bandwidth of a low-bandwidth connection without noticeable degradation in the quality of the connection. In some embodiments, a group of low-bandwidth video streams created at block 508 may use fewer than the maximum number of low-bandwidth video streams to leave room for the set of auxiliary data streams. Optional block 510 is illustrated as optional because, like in optional block 504, in some embodiments auxiliary data streams may not be provided to the procedure 500.

At block 512, each group of streams is provided as a combined data stream. The procedure 500 then advances to an end block and terminates.

FIG. 6 is a flowchart that illustrates a non-limiting example embodiment of a procedure for recovering images from a combined data stream according to various aspects of the present disclosure. The procedure 600 is a non-limiting example of a procedure suitable for use at subroutine block 410 of the method 400 illustrated and described above.

From a start block, the procedure 600 advances to block 602, where a set of low-bandwidth video streams in a bandwidth-capped codec are extracted from the combined data stream. In some embodiments, the combined data stream includes multiple separable data streams, and so extracting individual low-bandwidth video streams may simply constitute selecting the desired separate data stream.

At block 604, each low-bandwidth video stream is transcoded from the bandwidth-capped codec to a variable-bandwidth codec (e.g., H.264, H.265, or other variable-bandwidth codecs) to create a recovered video stream. In some embodiments, the low-bandwidth video stream is transcoded to a variable-bandwidth codec that matches a variable-bandwidth codec produced by the cameras 108 (or otherwise received by the edge computing device 106) so that images extracted from the recovered video stream will match images received by the edge computing device 106 from the cameras 108 as closely as possible, so that the training data created based on the extracted images will be usable to train machine learning models to accept the images received from the cameras 108 as input.

In some embodiments, the bandwidth-capped codec may be transcoded to multiple different formats. For example, the bandwidth-capped codec may be transcoded into a format compatible with HTTP Live Streaming, and may be stored by the model management computing system 102 to be provided in on-demand streams of live or recorded video data.

At block 606, one or more images are extracted from each recovered video stream. In some embodiments, the images extracted from each recovered video stream are frames (or portions thereof) of the recovered video stream.

The procedure 600 then advances to an end block and terminates.

Figure 7:
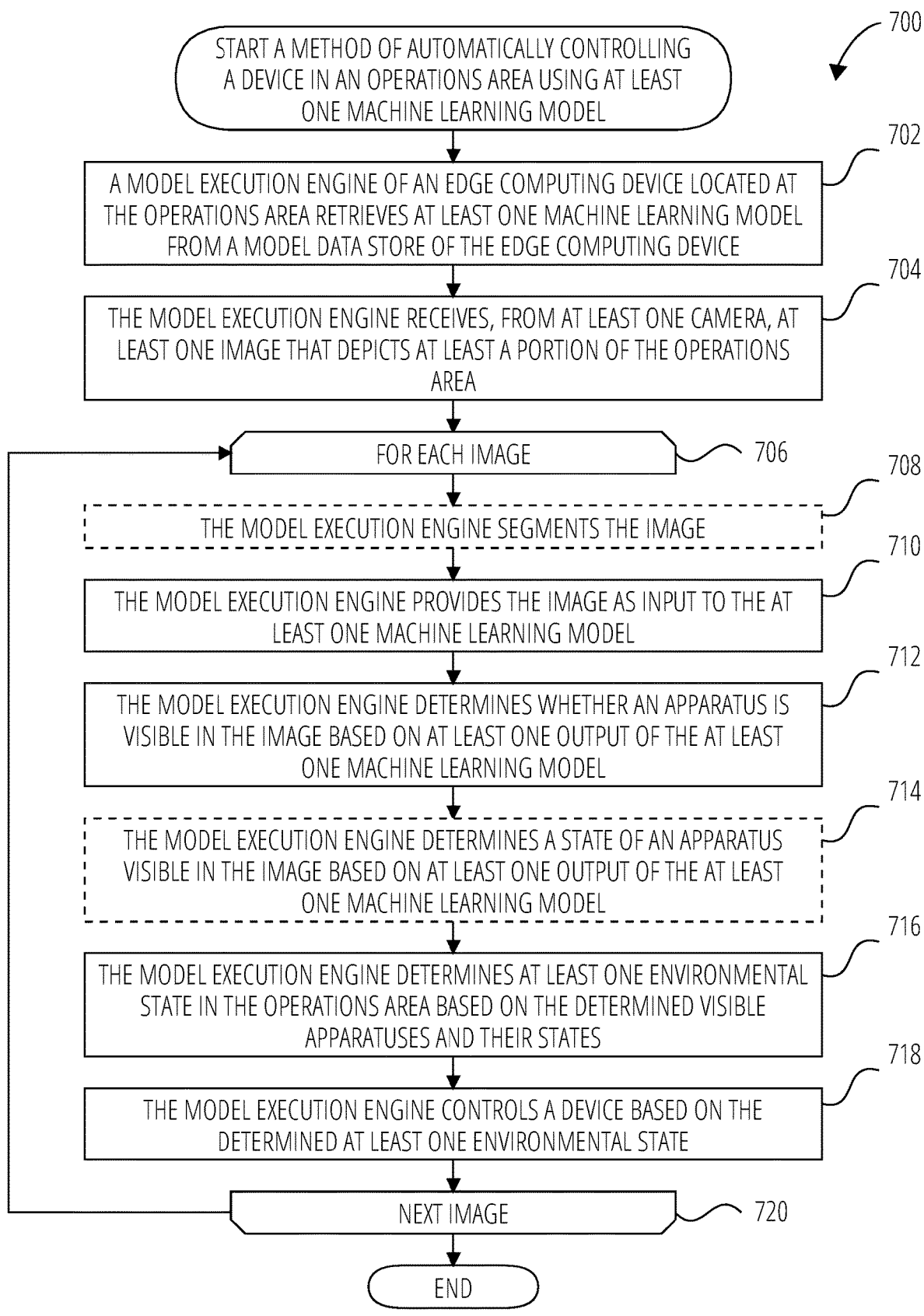
FIG. 7 is a flowchart that illustrates a non-limiting example embodiment of a method of automatically controlling a device in an operations area using at least one machine learning model according to various aspects of the present disclosure.

FIG. 7 is a flowchart that illustrates a non-limiting example embodiment of a method of automatically controlling a device in an operations area using at least one machine learning model according to various aspects of the present disclosure.

In block 702, a model execution engine 312 of an edge computing device 106 located at the operations area 104 retrieves at least one machine learning model from a model data store 308 of the edge computing device 106. In some embodiments, the edge computing device 106 may determine an appropriate machine learning model to be used. The determination may be based on a position of one or more cameras 108 communicatively coupled to the edge computing device 106, a time of day, a weather, or any other factor for which separate machine learning models were trained and stored in the model data store 308. In some embodiments, the model data store 308 may store a single machine learning model, in which case the edge computing device 106 may simply retrieve the single machine learning model from the model data store 308.

In block 704, the model execution engine 312 receives, from at least one camera 108, at least one image that depicts at least a portion of the operations area 104. The method 700 then proceeds to a for-loop defined between a for-loop start block 706 and a for-loop end block 720, wherein each of the images obtained from the at least one camera 108 is processed. The model execution engine 312 may receive multiple images over time (such as from a video or streaming feed from the at least one camera 108), and the for-loop may be executed for each image received over time. The for-loop is described as operating over a single image at once for the sake of simplifying the present discussion, but in some embodiments, the for-loop may process multiple images at once, such as contemporaneously captured images from multiple different cameras 108 with different viewpoints of the same operations area 104.

From the for-loop start block 706, the method 700 proceeds to optional block 708, where the model execution engine 312 segments the image. If one or more of the machine learning models have been trained to process segmented images, then the actions of optional block 708 are performed to segment the image to match the segmentation of the images making up the training data used to train the machine learning models.

In block 710, the model execution engine 312 provides the image as input to the at least one machine learning model. In some embodiments, the image itself may be provided to the at least one machine learning model. In some embodiments, features that match features extracted from the training images while training the at least one machine learning model (as discussed above with respect to block 418) may be extracted from the image, and may be provided instead of or in addition to the raw image itself.

In block 712, the model execution engine 312 determines whether an apparatus is visible in the image based on at least one output of the at least one machine learning model. In some embodiments, the at least one machine learning model produces a Boolean value, a confidence value, or other suitable output indicating the presence or absence of one or more apparatuses it is trained to detect. For example, a machine learning model trained to detect a presence or absence of an aircraft may provide values indicating "aircraft present" (FIG. 8B-FIG. 8D; FIG. 9B-FIG. 9D) or "aircraft absent" (FIG. 8A; FIG. 9A) as output. Likewise, a machine learning model trained to detect a presence or absence of a ground service vehicle may provide values indicating "ground service vehicle present" (FIG. 9C, FIG. 9D) or "ground service vehicle absent" (FIG. 9A, FIG. 9B) as output.

In optional block 714, the model execution engine 312 determines a state of an apparatus visible in the image based on at least one output of the at least one machine learning model. Again, the at least one machine learning model may produce a Boolean value, a value from a predetermined set, a confidence value, or other suitable output indicating a state of an apparatus. The actions of optional block 714 are described as optional because even if a machine learning model is trained to determine a state of an apparatus, if the given apparatus is not visible in the image, the status may not be meaningful and so the actions of optional block 714 may be skipped. For example, if an aircraft is present, a machine learning model trained to determine a state of the aircraft door may provide values indicating "aircraft door open" (FIG. 8C, FIG. 8D) or "aircraft door closed" (FIG. 8B). As another example, if an auto level wheel is visible, then a machine learning model trained to determine a state of the auto level wheel may provide values indicating "auto level wheel retracted" (FIG. 8A-FIG. 8C) or "auto level wheel extended" (FIG. 8D). As yet another example, if a ground service vehicle is visible, then a machine learning model trained to determine a state of the cargo area of the ground service vehicle may provide values indicating "cargo area retracted" (FIG. 9C) or "cargo area extended" (FIG. 9D).

In block 716, the model execution engine 312 determines at least one environmental state in the operations area 104 based on the determined visible apparatuses and their statuses. In some embodiments, the mere presence or absence of a given apparatus and/or the status of an apparatus may be the environmental state determined by the model execution engine 312 at block 716. For example, if an aircraft is determined to be present, then an "aircraft present" environmental state may be determined. As another example, if a person is detected on a passenger boarding bridge, then an "aircraft boarding" or "aircraft deboarding" environmental state may be determined.

In some embodiments, a combination of the presence or absence of given apparatuses and/or the statuses of given apparatuses may constitute the environmental state determined by the model execution engine 312 at block 716. For example, the model execution engine 312 may use a combination of the presence/absence of an aircraft, a state of the aircraft door, and a state of the auto level wheel to determine an environmental state relating to configuration safety. If an aircraft is determined to be present, the state of the aircraft door is determined to be open, and the state of the auto level wheel is determined to be extended, then the environmental state is determined to be normal. If an aircraft is determined to be present and the state of the aircraft door is determined to be closed, then the environmental state may also be determined to be normal regardless of the state of the auto level wheel. If an aircraft is determined to be present, the state of the aircraft door is determined to be open, and the state of the auto level wheel is determined to be retracted, then the environmental state is determined to be "dangerous."

In block 718, the model execution engine 312 controls a device based on the determined at least one environmental state. In some embodiments, a simple action may be taken. For example, in response to determining an environmental state such as "aircraft present" (or a transition from an "aircraft absent" environmental state to an "aircraft present" environmental state) the model execution engine 312 may control a device to record a time of the arrival or departure of the aircraft, or to transmit a notification of the arrival or departure of the aircraft to another system. In some embodiments, a more complex action may be taken. For example, in response to determining an environmental state such as the "dangerous" environmental state described above, the model execution engine 312 may cause an alarm device on the passenger boarding bridge to be activated (e.g., by using a display device and/or loudspeaker to present an alert), may cause a device to transmit a warning to an Aircraft Communications Addressing and Reporting System (ACARS) system on the aircraft to warn the flight crew of the danger of the disengaged auto level wheel, or cause a device to perform any other type of remedial action.

From block 718, the method 700 proceeds to for-loop end block 720. If further images remain to be processed, then the method 700 returns to for-loop start block 706 to process the next image. Otherwise, if all of the images have been processed, then the method 700 proceeds to an end block and terminates.

Figure 10:
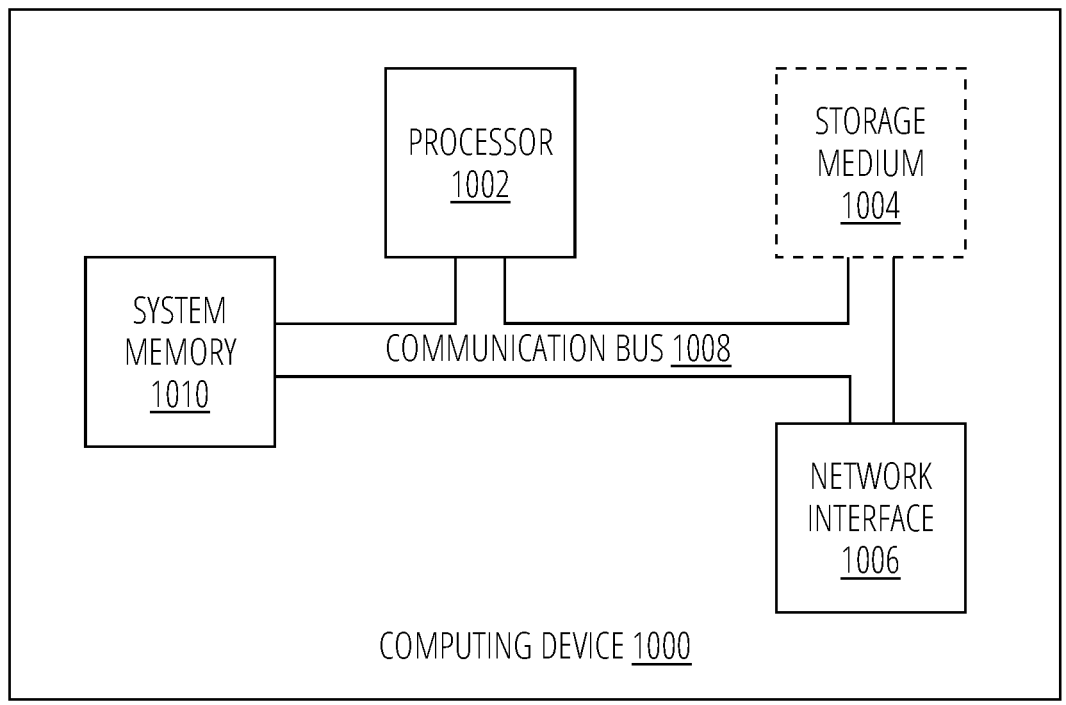
FIG. 10 is a block diagram that illustrates a non-limiting example embodiment of a computing device appropriate for use as a computing device with embodiments of the present disclosure.

FIG. 10 is a block diagram that illustrates aspects of an exemplary computing device 1000 appropriate for use as a computing device of the present disclosure. While multiple different types of computing devices were discussed above, the exemplary computing device 1000 describes various elements that are common to many different types of computing devices. While FIG. 10 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 1000 may be any one of any number of currently available or yet to be developed devices.

In its most basic configuration, the computing device 1000 includes at least one processor 1002 and a system memory 1010 connected by a communication bus 1008. Depending on the exact configuration and type of device, the system memory 1010 may be volatile or nonvolatile memory, such as read only memory ("ROM"), random access memory ("RAM"), EEPROM, flash memory, or similar memory technology. Those of ordinary skill in the art and others will recognize that system memory 1010 typically stores data and/or program modules that are immediately accessible to and/or currently being operated on by the processor 1002. In this regard, the processor 1002 may serve as a computational center of the computing device 1000 by supporting the execution of instructions.

As further illustrated in FIG. 10, the computing device 1000 may include a network interface 1006 comprising one or more components for communicating with other devices over a network. Embodiments of the present disclosure may access basic services that utilize the network interface 1006 to perform communications using common network protocols. The network interface 1006 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 1006 illustrated in FIG. 10 may represent one or more wireless interfaces or physical communication interfaces described and illustrated above with respect to particular components of the computing device 1000.

In the exemplary embodiment depicted in FIG. 10, the computing device 1000 also includes a storage medium 1004. However, services may be accessed using a computing device that does not include means for persisting data to a local storage medium. Therefore, the storage medium 1004 depicted in FIG. 10 is represented with a dashed line to indicate that the storage medium 1004 is optional. In any event, the storage medium 1004 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 1002, system memory 1010, communication bus 1008, storage medium 1004, and network interface 1006 are known and commercially available. For ease of illustration and because it is not important for an understanding of the claimed subject matter, FIG. 10 does not show some of the typical components of many computing devices. In this regard, the computing device 1000 may include input devices, such as a keyboard, keypad, mouse, microphone, touch input device, touch screen, tablet, and/or the like. Such input devices may be coupled to the computing device 1000 by wired or wireless connections including RF, infrared, serial, parallel, Bluetooth, Bluetooth low energy, USB, or other suitable connections protocols using wireless or physical connections. Similarly, the computing device 1000 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

The invention claimed is:

1. A system comprising:
a passenger boarding bridge including:
a bridge cowling positioned at a free end of the passenger boarding bridge, the bridge cowling defining a bridge opening, the bridge cowling configured to engage an exterior surface of an aircraft and surround a door of the aircraft; and
an autolevel wheel repositionable between a stowed positioned and a deployed position where the autolevel wheel extends through the bridge opening to engage the exterior surface of the aircraft;
a camera positioned to obtain image data of the free end of the passenger boarding bridge including the bridge cowling, the bridge opening, the autolevel wheel, and portions of the aircraft visible through the bridge opening; and
one or more processing circuits including one or more memory devices coupled to one or more processors, the one or more memory devices configured to store instructions thereon that, when executed by the one or more processors, cause the one or more processors to:
store a machine learning model in the one or more memory devices;
receive image data from the camera;
process the image data using the machine learning model to determine (a) whether the bridge cowling is in engagement with the aircraft and surrounding the door, (b) whether the door is open or closed, and (c) whether the autolevel wheel is in the stowed position or the deployed position; and
provide an alert in response to the bridge cowling being in engagement with the aircraft, the door being opened, and the autolevel wheel being in the stowed position.

2. The system of claim 1, further comprising an edge computing device, wherein the edge computing device includes at least one of the one or more processing circuits.

3. The system of claim 1, wherein the camera is positioned inside of the passenger boarding bridge.

4. The system of claim 1, further comprising a loudspeaker, wherein providing the alert includes activating the loudspeaker.

5. The system of claim 1, further comprising a Communications Addressing and Reporting System (ACARS) transmitter, wherein providing the alert includes transmitting a signal via the ACARS transmitter.

6. The system of claim 1, wherein the instructions cause the one or more processors to refrain from providing the alert in response to the bridge cowling being in engagement with the aircraft, the door being closed, and the autolevel wheel being in the stowed position.

7. The system of claim 1, wherein the instructions cause the one or more processors to refrain from providing the alert in response to the bridge cowling being in engagement with the aircraft, the door being open or opened, and the autolevel wheel being in the deployed position.

8. A system comprising:
a passenger boarding bridge including:
a bridge cowling positioned at a free end of the passenger boarding bridge, the bridge cowling defining a bridge opening, the bridge cowling configured to engage an exterior surface of an aircraft and surround a door of the aircraft; and
an autolevel wheel repositionable between a stowed positioned and a deployed position where the autolevel wheel extends through the bridge opening to engage the exterior surface of the aircraft;
a camera positioned inside of the passenger boarding bridge to obtain image data of the free end of the passenger boarding bridge including the bridge cowling, the bridge opening, the autolevel wheel, and portions of the aircraft visible through the bridge opening; and
one or more processing circuits including one or more memory devices coupled to one or more processors, the one or more memory devices configured to store instructions thereon that, when executed by the one or more processors, cause the one or more processors to:
acquire image data from the camera;
process the image data using a machine learning model to determine (a) whether the bridge cowling is in engagement with the aircraft and surrounding the door, (b) whether the door is open or closed, and (c) whether the autolevel wheel is in the stowed position or the deployed position; and
provide an alert in response to the bridge cowling being in engagement with the aircraft, the door being opened, and the autolevel wheel being in the stowed position.

9. The system of claim 8, further comprising an edge computing device, wherein the edge computing device includes at least one or the one or more processing circuits.

10. The system of claim 8, further comprising a loudspeaker, wherein providing the alert includes activating the loudspeaker.

11. The system of claim 8, further comprising a Communications Addressing and Reporting System (ACARS) transmitter, wherein providing the alert includes transmitting a signal via the ACARS transmitter.

12. The system of claim 8, wherein the instructions cause the one or more processors to refrain from providing the alert in response to the bridge cowling being in engagement with the aircraft, the door being closed, and the autolevel wheel being in the stowed position.

13. The system of claim 8, wherein the instructions cause the one or more processors to refrain from providing the alert in response to the bridge cowling being in engagement with the aircraft, the door being open or opened, and the autolevel wheel being in the deployed position.

14. A system comprising:
at least one camera configured to be positioned inside of a passenger boarding bridge to obtain image data including (a) a free end of the passenger boarding bridge defining a bridge opening, (b) a bridge cowling positioned at the free end and configured to engage an exterior surface of an aircraft and surround a door of the aircraft, (c) an autolevel wheel repositionable between a stowed positioned and a deployed position where the autolevel wheel extends through the bridge opening to engage the exterior surface of the aircraft, and (d) portions of the aircraft visible through the bridge opening; and
a non-transitory computer-readable medium having instructions stored thereon that when executed by one or more processors, cause the one or more processors to:
acquire the image data from the camera;
process the image data using a machine learning model to determine (a) whether the bridge cowling is in engagement with the aircraft and surrounding the door of the aircraft, (b) whether the door is open or closed, and (c) whether the autolevel wheel is in the stowed position or the deployed position; and
provide an alert in response to the bridge cowling being in engagement with the aircraft, the door of the aircraft being opened, and the autolevel wheel being in the stowed position.

15. The system of claim 14, wherein the instructions cause the one or more processors to refrain from providing the alert in response to the bridge cowling being in engagement with the aircraft, the door being closed, and the autolevel wheel being in the stowed position.

16. The system of claim 14, wherein the instructions cause the one or more processors to refrain from providing the alert in response to the bridge cowling being in engagement with the aircraft, the door being open or opened, and the autolevel wheel being in the deployed position.

17. The system of claim 14, wherein providing the alert includes activating a loudspeaker.

18. The system of claim 14, wherein providing the alert includes transmitting a signal via a Communications Addressing and Reporting System (ACARS) transmitter.

* * * * *